(12) United States Patent
Sterns et al.

(10) Patent No.: US 9,990,649 B2
(45) Date of Patent: Jun. 5, 2018

(54) SYSTEM AND METHOD FOR MANAGING MESSAGE CAMPAIGN DATA

(71) Applicant: Selligent, Inc., Redwood City, CA (US)

(72) Inventors: Jeremy Sterns, San Francisco, CA (US); Tulsi Ram Mayala, Redwood City, CA (US)

(73) Assignee: Selligent, Inc., Redwood City, CA (US)

( * ) Notice: Subject to any disclaimer, the term of this patent is extended or adjusted under 35 U.S.C. 154(b) by 379 days.

(21) Appl. No.: 14/508,978

(22) Filed: Oct. 7, 2014

(65) Prior Publication Data

US 2015/0100412 A1 Apr. 9, 2015

Related U.S. Application Data

(60) Provisional application No. 61/888,977, filed on Oct. 9, 2013.

(51) Int. Cl.
*G06Q 30/00* (2012.01)
*G06Q 30/02* (2012.01)

(52) U.S. Cl.
CPC ..... *G06Q 30/0242* (2013.01); *G06Q 30/0251* (2013.01)

(58) Field of Classification Search
None
See application file for complete search history.

(56) References Cited

U.S. PATENT DOCUMENTS 6,651,063 B1* 11/2003 Vorobiev .......... G06F 17/30699
7,698,462 B2    4/2010 McQuillen et al.
8,935,344 B2    1/2015 Mayala et al.
2001/0037359 A1* 11/2001 Mockett .......... G06F 17/30867
                                                              709/203
2001/0054134 A1* 12/2001 Nagatomo ............ G06F 21/10
                                                              711/163
2002/0019764 A1*  2/2002 Mascarenhas ........ G06Q 30/02
                                                              707/792

(Continued)

OTHER PUBLICATIONS

Richard O. Duda et al. *"Pattern Classification"*, 2nd Ed., New York, John Wiley & Sons, Inc., 2000, 738 total pages.

(Continued)

*Primary Examiner* — Matthew T Sittner
(74) *Attorney, Agent, or Firm* — Crowell & Moring LLP

(57) ABSTRACT

A data-management server system comprising one or more processors and memory establishes separate storage areas for first and second data-collection server systems. The data-management server system receives, from the first data-collection server system, first information that corresponds to feedback from a first set of users and excludes information that reveals the identity of individual users in the first set of users and receives, from the second data-collection server system, second information that corresponds to feedback from a second set of users that excludes information that reveals the identity of individual users in the second set of users. The data-management server system stores the first information in a first storage area, stores the second information in a second storage area, and provides access to the first and second information through one or more gatekeeper processes that control access to data received from the data-collection systems.

20 Claims, 14 Drawing Sheets

(56) References Cited

U.S. PATENT DOCUMENTS

| | | | | |
|---|---|---|---|---|
| 2003/0196056 A1* | 10/2003 | Vishlitzky | G06F 3/0601 | 711/165 |
| 2004/0106456 A1* | 6/2004 | Yamada | A63F 13/10 | 463/43 |
| 2004/0181598 A1* | 9/2004 | Paya | G06F 17/30902 | 709/227 |
| 2004/0255143 A1* | 12/2004 | Wemyss | G06F 21/335 | 726/9 |
| 2005/0143084 A1* | 6/2005 | Cheng | H04W 8/24 | 455/452.2 |
| 2005/0165867 A1* | 7/2005 | Barton | G06F 11/1464 | |
| 2006/0031094 A1* | 2/2006 | Cohen | A61M 5/1723 | 705/2 |
| 2006/0161856 A1* | 7/2006 | Heir | G06F 9/4443 | 715/769 |
| 2006/0212495 A1* | 9/2006 | Tokunaga | G06F 17/30339 | |
| 2007/0006250 A1* | 1/2007 | Croy | H04H 60/37 | 725/9 |
| 2007/0112890 A1* | 5/2007 | Murase | G06F 17/30011 | |
| 2007/0143455 A1* | 6/2007 | Gorman | G06F 11/3495 | 709/223 |
| 2007/0288302 A1* | 12/2007 | Singh | G06Q 10/00 | 705/35 |
| 2008/0040175 A1* | 2/2008 | Dellovo | G06Q 10/0637 | 705/7.36 |
| 2008/0086361 A1* | 4/2008 | Eliezerov | G06Q 30/02 | 705/7.32 |
| 2008/0162838 A1* | 7/2008 | Cho | G06F 8/65 | 711/159 |
| 2008/0320560 A1* | 12/2008 | Casey | H04L 63/10 | 726/3 |
| 2009/0018903 A1* | 1/2009 | Iyer | G06Q 10/10 | 705/14.14 |
| 2009/0030802 A1* | 1/2009 | Plotnick | G06Q 30/0258 | 705/14.56 |
| 2009/0031428 A1* | 1/2009 | Brew | G06F 21/10 | 726/27 |
| 2009/0182603 A1* | 7/2009 | Yoshioka | G06Q 30/02 | 705/7.32 |
| 2009/0187414 A1* | 7/2009 | Haskins | G06Q 50/10 | 705/1.1 |
| 2009/0274365 A1* | 11/2009 | Tsuda | G06T 3/4007 | 382/166 |
| 2010/0005244 A1* | 1/2010 | Weiberle | G06F 11/1658 | 711/130 |
| 2010/0161747 A1* | 6/2010 | Rayan | G06F 21/6263 | 709/206 |
| 2010/0185641 A1* | 7/2010 | Brazier | G06Q 30/02 | 707/758 |
| 2010/0250477 A1 | 9/2010 | Yadav | | |
| 2010/0313009 A1* | 12/2010 | Combet | G06Q 30/0204 | 713/150 |
| 2011/0238507 A1* | 9/2011 | Ben-Rubi | G06Q 30/0277 | 705/14.73 |
| 2011/0258407 A1* | 10/2011 | Naganuma | G06F 3/0605 | 711/162 |
| 2011/0271073 A1* | 11/2011 | Ikeda | G06F 11/1402 | 711/170 |
| 2012/0059716 A1* | 3/2012 | Agarwal | G06Q 30/02 | 705/14.52 |
| 2013/0054329 A1* | 2/2013 | Bhatia | G06Q 30/02 | 705/14.23 |
| 2013/0166648 A1* | 6/2013 | Allard | G06Q 30/0242 | 709/204 |
| 2013/0227225 A1* | 8/2013 | Oliver | G06F 21/316 | 711/154 |
| 2013/0239130 A1* | 9/2013 | Atamna | G06F 17/30073 | 719/328 |
| 2013/0262267 A1* | 10/2013 | Taylor | G06Q 30/0203 | 705/26.41 |
| 2013/0268357 A1* | 10/2013 | Heath | H04L 63/00 | 705/14.53 |
| 2013/0290628 A1* | 10/2013 | Hayashi | G06F 3/0611 | 711/114 |
| 2014/0040008 A1* | 2/2014 | Belani | G06Q 30/02 | 705/14.41 |
| 2014/0067520 A1* | 3/2014 | Campanile | G06Q 30/0243 | 705/14.42 |
| 2014/0089585 A1* | 3/2014 | Nakajima | G06F 13/1663 | 711/118 |
| 2014/0101110 A1* | 4/2014 | Rittle | H04L 69/40 | 707/654 |
| 2014/0149741 A1* | 5/2014 | Balakrishnan | G06F 21/335 | 713/159 |
| 2014/0280299 A1* | 9/2014 | Crook | G06F 17/30864 | 707/769 |
| 2014/0372653 A1* | 12/2014 | Hsieh | G06F 12/14 | 710/305 |
| 2015/0100412 A1* | 4/2015 | Sterns | G06Q 30/0242 | 705/14.41 |
| 2015/0134471 A1* | 5/2015 | Celhar | G06Q 30/0201 | 705/26.5 |
| 2016/0021020 A1* | 1/2016 | Deguchi | G06F 3/061 | 709/226 |
| 2016/0217489 A1* | 7/2016 | Allard | G06Q 30/0246 | |

OTHER PUBLICATIONS

Alan Agresti "*An Introduction to Categorical Data Analysis*", New York, John Wiley & Sons, Inc., 1996, 394 total pages.

* cited by examiner

```
<table class="width-320" width="660" border="0"
cellspacing="0" cellpadding="0" bgcolor="#FFFFFF">
        <tr>

<!-- Begin Slot 1 -->
        <td class="float-left">
```
SV_BEGIN_REGION[Slot1][~offer1]##`<table
class="width-315 padding-left-5" align="left" width="330"
border="0" cellspacing="0" cellpadding="0"
bgcolor="#FFFFFF">`

`...`
`</tr>`
         `</table></td>`
      `</tr>`
     `</table></td>`
    `</tr>`
   `</table>`##SV_END_REGION##`</td>`
`<!-- End Slot 1 -->`

Figure 13

SYSTEM AND METHOD FOR MANAGING MESSAGE CAMPAIGN DATA

RELATED APPLICATIONS

This application claims priority to U.S. Provisional Patent Application Ser. No. 61/888,977, filed Oct. 9, 2013, entitled "System and Method for Managing Message Campaign Data," which application is incorporated by reference in its entirety.

FIELD OF THE INVENTION

The present invention relates generally to the field of computer data management, and in particular, to a system and method for efficiently managing message campaign data.

BACKGROUND OF THE INVENTION

Message campaigns that provide information to a large number of recipients can be run using a variety of messaging means. Delivering messages in a message campaign electronically (e.g., via email, SMS, social networking message, or other electronic message) is a fast and efficient way to get timely information to message campaign recipients. However, it is important for both the senders and recipients of message campaigns that the message campaigns be as relevant to the recipients as possible. Thus, the organizers of message campaigns frequently collect feedback data about the performance of message campaigns that includes both explicit feedback data (e.g., user surveys) and implicit feedback data (e.g., user responsiveness to the message campaign in the form of purchases and/or engagement of the user with a message in the message campaign, or lack thereof). Electronic message campaigns provide the opportunity to collect increasing amounts of feedback data. However, conventional approaches to processing feedback data from message campaigns fail to take satisfactory advantage of the feedback data and thus result in future message campaigns that are less useful/relevant for recipients and are less effective/efficient for the message campaign organizers.

SUMMARY

As such, it would be advantageous to be able to store and process feedback data from message campaigns more effectively and efficiently so that message campaign organizers can create message campaigns that are more useful and relevant to the recipients of the message campaign. However, feedback data for even a single message campaign that is sent to a large number of users can include a large amount of data. Collecting feedback data for a large number of message campaigns over a long period of time can be very useful for comparing the performance of different message campaigns, however storing this data locally would require increasing amounts of storage as additional feedback data is received. Pre-aggregating the feedback data can reduce the rate at which the amount of feedback data increases and decrease the overall amount of storage space occupied by the feedback data. However, pre-aggregated feedback data has limited flexibility and can only be used for responding to a limited set of queries (e.g., one or more predefined queries that do not require information that was lost during the aggregation of the data). Thus, it would be advantageous to be able to store feedback data that can be analyzed using arbitrary queries without using up local storage space. By way of example, such arbitrary queries include queries that were conceived of or refined after one or more message campaigns have been initiated. Transmitting the feedback data to a remote storage system without pre-aggregating the data (e.g., storing "raw" feedback data) enables arbitrary queries to be run against the data without using up local storage space. The systems and methods described herein provide an improved approach to storing and analyzing feedback data from message campaigns that enable message campaign organizers to create message campaigns that are more useful and relevant to the recipients and are more effective.

In accordance with some embodiments, a method is performed at a server system with one or more processors and memory. The method includes obtaining user profiles for a plurality of users for which message interaction data is stored and receiving profile-update information indicative of a change to a respective profile of a respective user of the plurality of users. The method also includes, in response to receiving the profile-update information, updating the respective profile of the respective user in accordance with the profile-update information, and initiating storage of profile-archive information that enables the server system to obtain a prior version of the respective profile. The method further includes, after updating the respective profile of the respective user, receiving, from a requestor, a request for analysis of the message interaction data, and in response to receiving the request for analysis of the message interaction data obtaining a message-interaction report that correlates the message interaction data with a set of one or more versions of profiles of one or more users that includes the prior version of the respective profile of the respective user and providing the message-interaction report to the requestor.

In accordance with some embodiments, a method is performed at a server system with one or more processors and memory. The method includes initiating delivery of a plurality of message campaigns to a plurality of users, where a respective message campaign of the plurality of message campaigns includes one or more messages addressed to at least a subset of the plurality of users. The method also includes receiving, from a plurality of client devices associated with the plurality of users, campaign-feedback data, where the campaign-feedback data is indicative of user interaction with the messages transmitted to the plurality of client devices as part of the plurality of message campaigns and after receiving the campaign-feedback data, conditionally transmitting, when a transmission criterion is satisfied, to one or more remote storage systems, campaign-tracking data that is based on the campaign-feedback data.

In accordance with some embodiments, a method is performed at a server system with one or more processors and memory. The method includes initiating delivery of a plurality of message campaigns to a plurality of users, where a respective message campaign of the plurality of message campaigns includes one or more messages addressed to at least a subset of the plurality of users, and receiving, from a plurality of client devices associated with the plurality of users, campaign-feedback data. The campaign-feedback data is indicative of user interaction with the messages transmitted to the plurality of client devices as part of the plurality of message campaigns. The campaign-feedback data includes information that enables generation of campaign reports that provide quantitative information about one or more of the plurality of message campaigns. The method also includes, after receiving the campaign-feedback data, transmitting, to one or more remote storage systems, campaign-tracking data that is based on the campaign-feedback data and after transmitting the campaign-tracking data to the one or more remote storage systems, receiving, from a requestor, a first request for analysis of the campaign-feedback information. The method further includes, in response to receiving the first request for analysis of the campaign-feedback information obtaining a campaign report generated using the campaign-tracking data from the one or more remote storage systems and providing the campaign report to the requestor.

In accordance with some embodiments, a method is performed at a server system with one or more processors and memory. The method includes initiating delivery of a plurality of message campaigns to a plurality of users that include a first campaign and a second campaign, where the first campaign and the second campaign each include one or more messages addressed to at least a subset of the plurality of users. The method also includes receiving, from a plurality of client devices associated with the plurality of users, campaign-feedback data for the first campaign and the second campaign. The campaign-feedback data is indicative of user interaction with the messages transmitted to the plurality of client devices as part of the plurality of message campaign. The method further includes, after receiving the campaign-feedback data, directing storage of campaign-tracking data that corresponds to the campaign-feedback data and after directing storage of the campaign-tracking data, receiving, from a requestor, a request for a campaign report for a respective user of the plurality of users. The method also includes, in response to receiving the request for a campaign report for the respective user obtaining a respective campaign report for the respective user, where the respective campaign report includes information indicative of the respective user's interactions with a first campaign and the respective user's interactions with the second campaign and providing the respective campaign report to the requestor.

In accordance with some embodiments, a method is performed at a server system with one or more processors and memory. The method includes receiving, from a client device, one or more messages for use in a message campaign that includes sending the one or more messages to a plurality of users, where the one or more messages include a plurality of annotations indicating human-identified features in the one or more messages. The method also includes initiating delivery of the message campaign to the plurality of users and receiving, from a plurality of client devices associated with the plurality of users, campaign-feedback data. The campaign-feedback data is indicative of user interaction, during the message campaign, that corresponds to presentation of at least one of the features identified by the one or more annotations. The method further includes, after receiving the campaign-feedback data, receiving, from a requestor, a request for analysis of the features of the one or more messages during the message campaign and in response to receiving the request for analysis of the features of the one or more messages obtaining a campaign report that provides information on one or more correlations between the features and user interaction with the features during the message campaign and providing the campaign report to the requestor.

In accordance with some embodiments, a method is performed at a server system with one or more processors and memory. The method includes establishing separate storage areas for data from a plurality of data-collection server systems that include a first data-collection server system and a second data-collection server system. The method also includes receiving, from the first data-collection server system, first information that corresponds to feedback data from a plurality of users associated with the first data-collection server system, where the first information was obtained from a first set of users associated with the first data-collection system and the first information excludes information that reveals the identity of individual users in the first set of users. The method further includes receiving, from the second data-collection server system, second information that corresponds to feedback data from a plurality of users associated with the second data-collection server system, where the second information was obtained from a second set of users associated with the second data-collection system and the second information excludes information that reveals the identity of individual users in the second set of users. The method also includes storing the first information in a first storage area for data from the first data-collection server system, storing the second information in a second storage area for data from the second data-collection server system, and providing access to the first information and the second information through one or more gatekeeper processes running on the data-management server system that control access to data received from the data-collection systems.

In accordance with some embodiments, a computer system (e.g., a client system or server system) includes one or more processors, memory, and one or more programs, the one or more programs are stored in the memory and configured to be executed by the one or more processors and the one or more programs include instructions for performing the operations of any of the methods described above. In accordance with some embodiments, a non-transitory computer readable storage medium has stored therein instructions which when executed by one or more processors, cause a computer system (e.g., a client system or server system) to perform the operations of the methods described above.

BRIEF DESCRIPTION OF THE DRAWINGS

For a better understanding of the disclosed embodiments, reference should be made to the Description of Embodiments below, in conjunction with the following drawings in which like reference numerals refer to corresponding parts throughout the figures.

FIG. 13 includes an example of inserting annotations into HTML code to mark human-identified features in messages in a message campaign.

DESCRIPTION OF EMBODIMENTS

Figure 1:
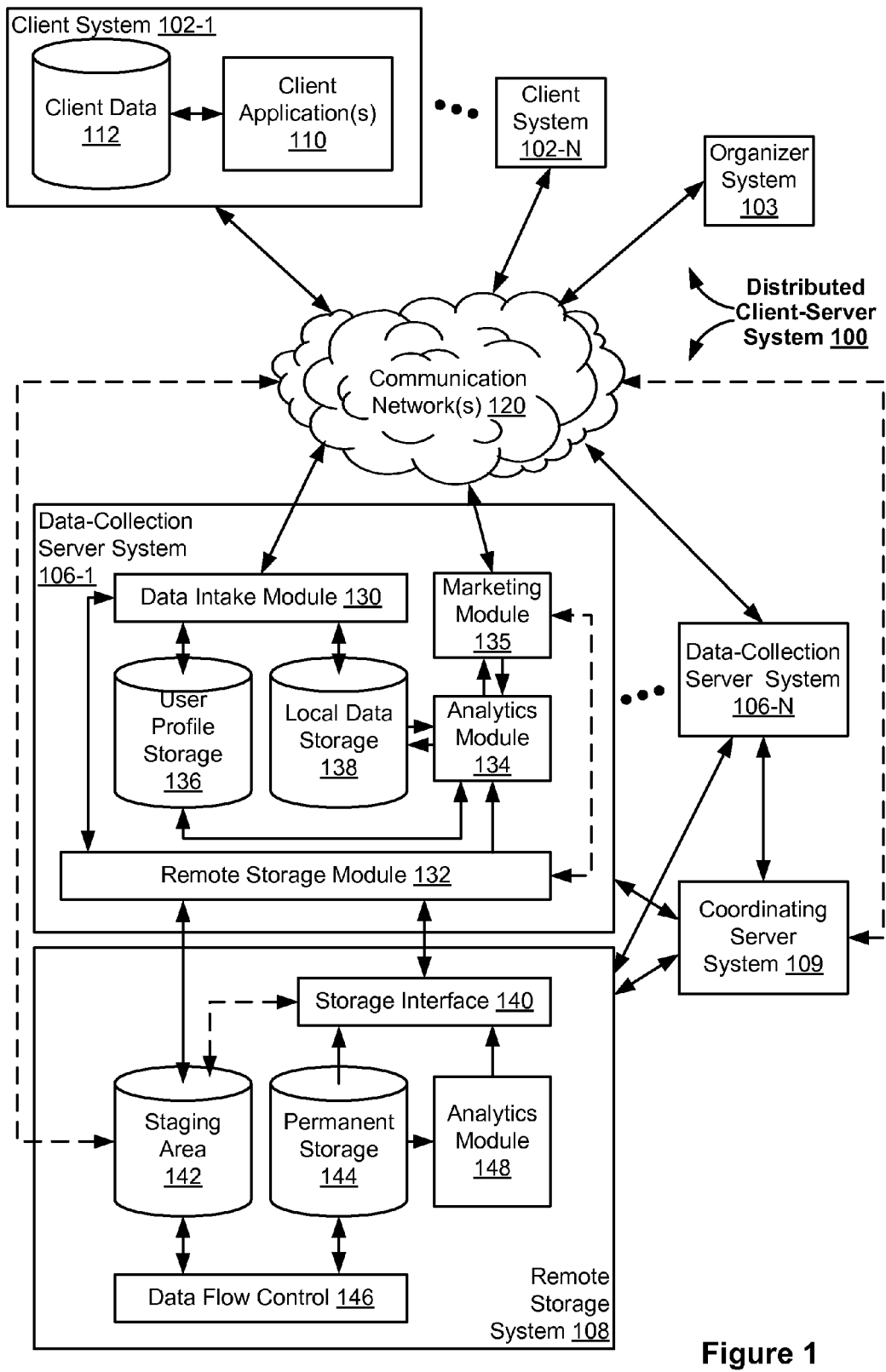
FIG. 1 is a block diagram illustrating a distributed client-server system, in accordance with some embodiments.

The present invention relates generally to the field of computer data management, and in particular, to a system and method for efficiently managing message campaign data. FIG. 1 includes a block diagram illustrating an exemplary distributed Client-Server System 100 for efficiently managing message campaign data. System 100 includes a plurality of Client Systems 102 (e.g., Client System 102-1) that receive messages as part of message campaigns initiated by one or more Data-Collection Server Systems 106 (e.g., Data-Collection System 106-1). Data-Collection Server Systems 106 collect feedback data that is indicative of user interactions with the message campaigns and store some of the data in Remote Storage System 108 and provide information about the feedback data such as campaign reports to Organizer Systems 103. In some implementations Organizer System 103 and Data-Collection Server System 106 are implemented as an integrated computer system (e.g., Organizer System 103 operates as a console for Data-Collection Server System 106). A Coordinating Server System 109 coordinates communication between the Remote Storage System 108, Data-Collection Server Systems 106, Organizer Systems 103, and Client Systems 102. A Communication Network 120 connects Client Systems 102, Organizer Systems 103, Data-Collection Server Systems 106, and Remote Storage System 108 and Coordinating Server System 109 to each other. Communication Network 120 optionally includes the Internet, one or more local area networks (LANs), one or more wide area networks (WANs), other types of networks, or a combination of such networks.

Client Systems 102 optionally include one or more Client Applications 110 and Client Data 112. Client System 102-N receives messages (e.g., email messages) from Data-Collection Server System 106-1 and, optionally, other data-collection server systems. For example, Client System 102-N receives emails including offers of products, admission to events, and/or services. After receiving the messages, Client System 102-N provides information to a feedback recipient (e.g., Data-Collection Server System 106-N or Remote Storage System 108) as to user interaction with the messages (e.g., by providing an indication of whether the messages have been opened, responded to, forwarded to other recipients, acted upon by taking an action specified by such messages, acted upon by taking an action made available by such messages such as activating a link or other activatable element in the messages, deleted, blocked, etc.). In some circumstances, a message server system (e.g., a short message service center (SMSC) or email server) receives messages for Client System 102 and forwards the messages to Client System 102 when Client System 102 becomes available (e.g., when the intended recipient logs into their email account or turns on their phone to receive SMS messages). In some embodiments (e.g., where a message server system forwards messages to Client System 102), certain status information (e.g., information that an intended recipient address does not exist, or the intended recipient's mailbox is full) is generated and sent to Data-Collection Server System 106 by the message server system (optionally, without communicating with Client System 102), while other status messages (e.g., information that a particular message was opened or an activatable element in the message was activated) are generated in response to actions that occur at Client System 102.

Organizer Systems 103 are used by message campaign organizers to run message campaigns and review feedback data related to the performance of message campaigns (e.g., feedback data provided by Data-Collection Server Systems 106). In some embodiments, Organizer Systems 103 get feedback data directly from Remote Storage System 108. In some embodiments, a respective Organizer System 103 communicates with Coordinating Server System 109 to set a performance level of Data-Collection Server System 106 and Remote Storage System 108 with respect to message campaigns that originate from (e.g., are initiated by) the respective Organizer System 103. As used herein, a message campaign includes a program of one or more rounds (or stages) of messages that are sent to a set of users for a marketing purpose such as providing information about products and services or building a brand relationship. In some embodiments this set of users is two or more users. In some embodiments, a marketing campaign includes one or more predefined rounds of messages that are sent to a predefined set of users (e.g., a back to school campaign that has an objective to push a particular product to particular kinds of people in a particular time frame). In some embodiments, a marketing campaign includes an ongoing interactive program that implements marketing business rules, such as a new customer welcome or onboarding program.

Data-Collection Server System 106-1 includes Data Intake Module 130, Remote Storage Module 132, Analytics Module 134, Marketing Module 135, User Profile Storage 136, and Local Data Storage 138. In some embodiments, Marketing Module 135 initiates message campaigns and other marketing programs, Data Intake Module 130 receives feedback data from Client Systems 102 that corresponds to the message campaigns transmitted to Client Systems 102. Data Intake Module 130 optionally receives information that enables a user profile to be stored in User Profile Storage 136 (e.g., explicit user-selected preference information received from Client Systems 102, implicit preference information based on interactions with one or more message campaigns by users at Client Systems 102, and/or pre-existing user preference information provided to Data Intake Module 130 by or at the direction of Organizer System 103). In some embodiments, feedback data from Client Systems 102 is stored in Local Data Storage 138 and/or is transmitted to Remote Storage Module 132 for storage at Remote Storage System 108.

In some embodiments, feedback data from Client Systems 102 is provided concurrently (or simultaneously) to both Local Data Storage 138 and also to Remote Storage Module 132 for storage in Remote Storage System 108 (e.g., Staging Area 142 in Remote Storage System 108). For example, feedback data from Client Systems 102 is continuously synchronized between Local Data Storage 138 and Remote Storage System 108 as feedback data is received. In some embodiments, feedback data from Client Systems 102 is provided first to Local Data Storage 138 and is, at a later time (e.g., in accordance with a predefined synchronization schedule) synchronized with Remote Storage System 108. For example, feedback data is initially stored in Local Data Storage 138 throughout the day, and at a time with low system activity (e.g., at midnight or 2 am), data that was stored in Local Data Storage 138 and/or User Profile Storage 136 throughout the day is retrieved by Remote Storage Module 132 (optionally with user profile information from User Profile Storage 136) and is transmitted to Remote Storage System 108 (e.g., Staging Area 142 in Remote Storage System 108), so that all of the feedback data and user profile information stored at Data-Collection Server System 106-1 is eventually transmitted to Remote Storage System 108, so that when feedback data or user profile information is deleted from Local Data Storage 138 and/or User Profile Storage 136, that data is still available at Remote Storage System 108 for use by Data-Collection Server System 106-1 (e.g., Analytics Module 134).

In some embodiments, feedback data is stored in Local Data Storage 138 for a limited amount of time (e.g., 7, 14, 21 days or some other reasonable amount of time) to enable the feedback data from recent message campaigns to be analyzed locally (e.g., by Analytics Module 134) and is deleted after this limited amount of time to conserve storage space at Data-Collection Server System 106-1. In some embodiments, Analytics Module 134 pre-aggregates the feedback data and stores the pre-aggregated feedback data in Local Data Storage 138, where the pre-aggregated data corresponds to feedback data that is older than the limited amount of time. This pre-aggregated data enables Analytics Module 134 to run a predefined set of analytics on the pre-aggregated data while conserving storage space Data-Collection Server System 106-1.

Remote Storage System 108 is a high-volume storage system (e.g., a server farm). In some embodiments, Data-Collection Server System 106-1 and Remote Storage System 108 are owned and operated by a same entity (e.g., person or company). In some embodiments, Remote Storage System 108 is a third-party storage system that is owned and operated by a different entity from the entity that owns and operates Data-Collection Server System 106-1 (e.g., the entity that owns and operates Data Collection Server System 106-1 rents capacity from the owner of Remote Storage System 108). One example of a third-party storage system is AMAZON REDSHIFT, which is a data warehouse service from which data storage capacity and associated compute resources can be leased on a flexible basis. An advantage to using a data warehouse service that is run by a third-party is that storage space and processing resources can be purchased on an as-needed basis, so that the storage space and processing resources (and corresponding cost) can expand and contract as needed to accommodate changing demand for storage of data and analytics workload.

Remote Storage System 108 receives data (e.g., feedback data for corresponding message campaigns) from Data Collection Systems 106 and/or Client Systems 102. In some embodiments, the data is received by Storage Interface 140 and, as such, Storage Interface 140 governs storage of the data in Staging Area 142 prior to being stored in Permanent Storage 144. In some embodiments, one or more Data-Collection Server Systems 106, Client Systems 102, and Organizer Systems 103 are enabled to write data directly to Staging Area 142 which is shared between these different data sources (e.g., Staging Area 142 operates as a write-only file transfer server). Data Flow Control 146 controls the flow of data stored in Staging Area 142 into Permanent Storage 144 (e.g., by directing data to segments of Permanent Storage 144 associated with particular data-collection systems). In some embodiments, Permanent Storage 144 is logically (and/or physically) segregated by data source, so that data from different Data-Collection Server Systems 106, or different predetermined groups of Data-Collection Server Systems 106, is directed to different, separate, areas of Permanent Storage 144, so as to preserve the confidentiality of the data stored in Permanent Storage 144. Data stored in Permanent Storage 144 is provided to Data-Collection Systems 106 on request. In some embodiments Analytics Module 148 analyzes and/or aggregates data stored in Permanent Storage 144 based on queries submitted to Storage Interface 140 by a requestor (e.g., a data-collection server system or a client system), and the analyzed and/or aggregated data is transmitted to the requestor (e.g., as a campaign report that corresponds to an analysis of feedback data from one or more message campaigns).

Coordinating Server System 109 coordinates operations at Remote Storage System 108, Data-Collection Server Systems 106 and, optionally, Client Systems 102. In some embodiments, Data-Collection Server Systems 106 and/or software running thereon is purchased or leased from the owner/operator of Coordinating Server System 109, and Coordinating Server System 109 includes administrative tools for controlling and/or modifying the operation of Data-Collection Server Systems 106. For example, Coordinating Server System 109 optionally monitors the operational status of Data-Collection Server Systems 106, provides license keys to Data-Collection Server Systems 106 that enable different message campaign capabilities of Data-Collection Server Systems 106 (e.g., setting a maximum rate at which messages can be sent out, a maximum number of recipients of a message campaign, an amount of data that can be stored at Remote Storage System 108, etc.), and/or tracks data usage of Data-Collection Server Systems 106 for billing purposes. Coordinating Server System 109 also, optionally, includes administrative tools for controlling and/or modifying the operation of Remote Storage System 108. For example, Coordinating Server System 109 optionally has read/write access to Staging Area 142 for debugging purposes, and optionally provides instructions to Remote Storage System 108 as to the service level to provide to different Data-Collection Server Systems 106 (e.g., a minimum requested data read/write speed and/or an amount of reserved storage space for data from a particular Data-Collection Server System 106).

Figure 2:
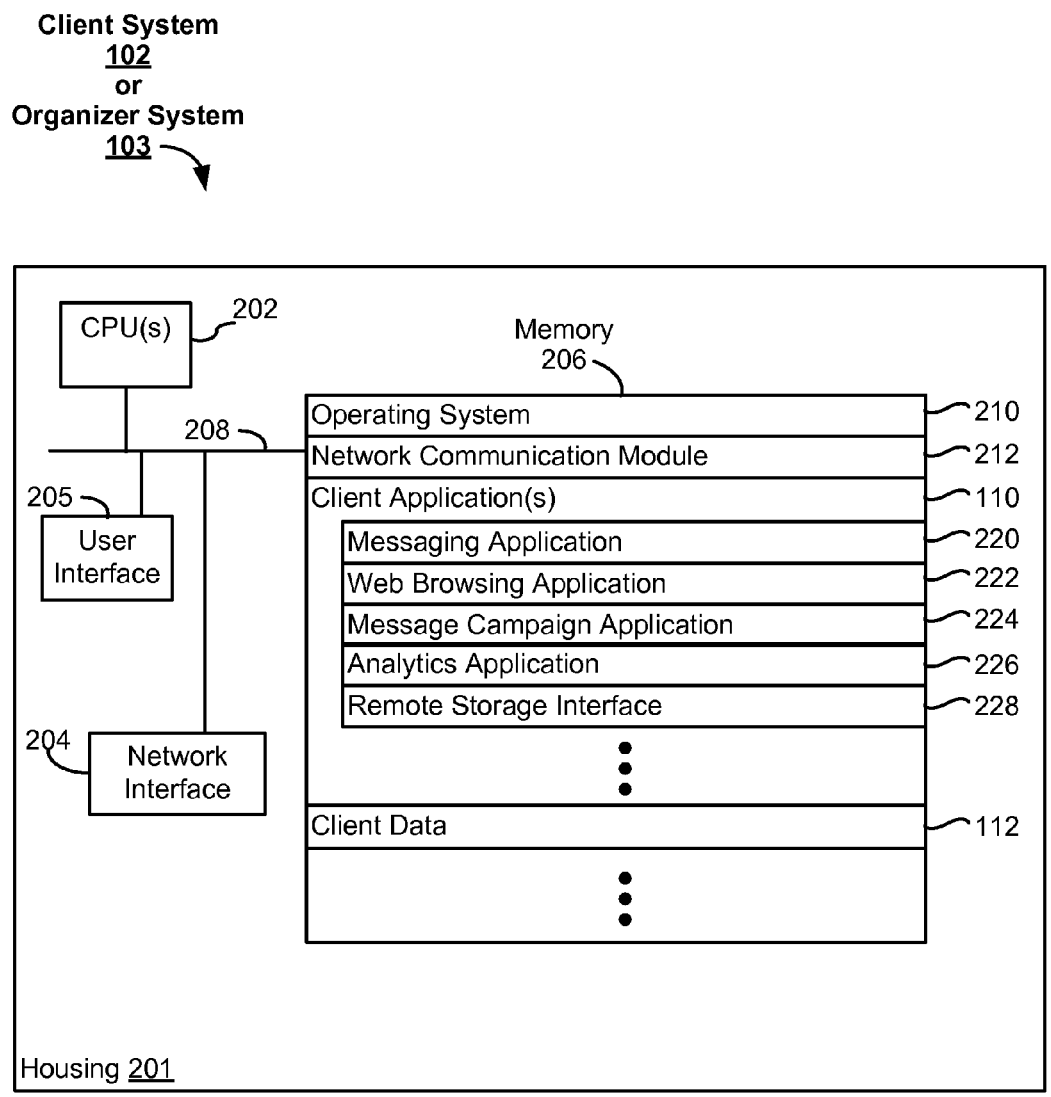
FIG. 2 is a block diagram illustrating a client system or an organizer system, in accordance with some embodiments.

FIG. 2 is a block diagram illustrating a Client System 102 or Organizer System 103 in accordance with some embodiments. Client System 102 or Organizer System 103 optionally includes Housing 201 and typically includes one or more processing units CPU(s) 202, one or more network or other Communication Interfaces 204, Memory 206, User Interface 205 comprising a display device and a keyboard, mouse, touchpad, touchscreen or other input device, and one or more Communication Buses 208 for interconnecting these components. Memory 206 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 206 optionally includes one or more storage devices remotely located from CPU(s) 202. Memory 206, or alternatively the non-volatile memory device(s) within Memory 206, comprises a non-transitory computer readable storage medium. In some embodiments, Memory 206 or alternatively the non-transitory computer readable storage medium stores the following programs, modules and data structures, or a subset thereof:

Operating System 210 that includes procedures for handling various basic system services and for performing hardware dependent tasks;

Network Communication Module (or instructions) 212, for connecting Client System 102 to other computers (e.g., Data-Collection Server System 106, Remote Storage System 108, and/or Coordinating Server System 109) via one or more Network Interfaces 204 (wired or wireless) and one or more Communication Networks 120 (FIG. 1), such as the Internet, other wide area networks, local area networks, metropolitan area networks, and so on;

Client Application(s) 110, for performing user-specified operations at Client System 102 and accessing, storing, and generating Client Data 112, including one or more of:

Messaging Application 220 (e.g., an email, SMS, social networking or other application that is capable of sending and/or receiving electronic messages), for sending and/or receiving electronic messages;

Web Browsing Application 222, for accessing websites and for rendering content stored in a web-browser interpretable formats (e.g., HTML. JavaScript, etc.), including webpages and web applications;

Message Campaign Application 224 for generating, modifying, and adding annotations to messages for message campaigns and for creating message campaign definitions including rules for running message campaigns;

Analytics Application 226, for requesting campaign reports for message campaigns that indicate message campaign recipient interaction with messages in the message campaigns; and Remote Storage Interface 228, for storing and/or retrieving information (e.g., campaign reports, campaign-tracking data, etc.) from Remote Storage System 108; and Client Data 112, optionally including messages received as part of a message campaign and/or campaign reports, campaign-tracking data, campaign-feedback data, and/or data for use in generating a new message campaign.

In some embodiments, the system is an Organizer System 103 that stores a Message Campaign Application 224, Analytics Application 226 and Remote Storage Interface 228. In some embodiments, the system is a Client System that stores a Messaging Application 220 and a Web Browsing Application 222 but not a Message Campaign Application 224, Analytics Application 226 or Remote Storage Interface 228.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, Memory 206 optionally stores a subset of the modules and data structures identified above. Furthermore, Memory 206 optionally stores additional modules and data structures not described above.

Figure 3:
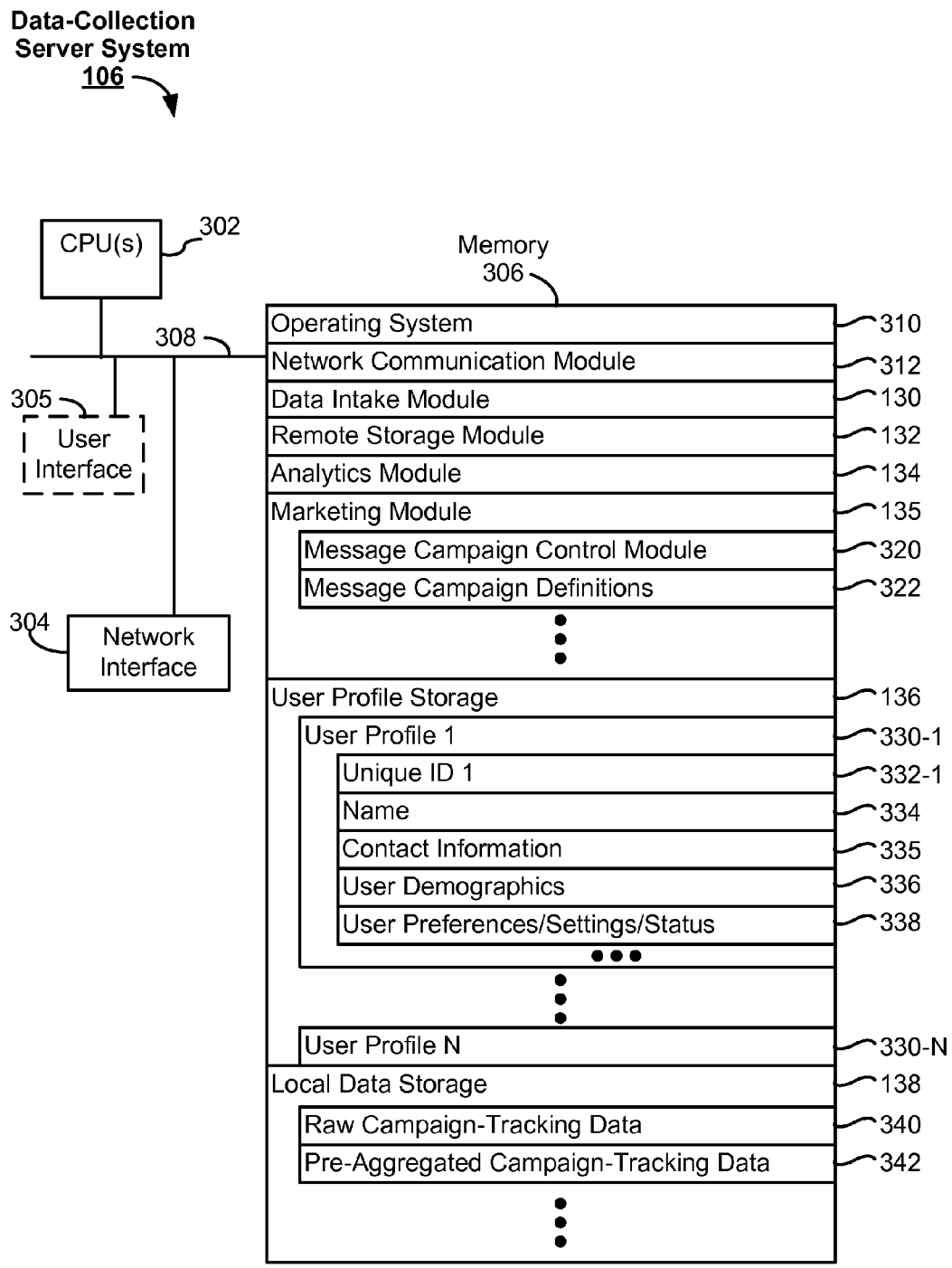
FIG. 3 is a block diagram illustrating a data-collection server system, in accordance with some embodiments.

FIG. 3 is a block diagram illustrating a Data-Collection Server System 106 in accordance with some embodiments. Data-Collection Server System 106 includes one or more processing units CPU(s) 302, one or more network or other Communication Interfaces 304, Memory 306, optionally a User Interface 305 comprising a display device and a keyboard, mouse, touchpad, touchscreen or other input device, and one or more Communication Buses 308 for interconnecting these components. Memory 306 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 306 optionally includes one or more storage devices remotely located from the CPU(s) 302. Memory 306, or alternatively the non-volatile memory device(s) within Memory 306, comprises a non-transitory computer readable storage medium. In some embodiments, Memory 306 or alternatively the non-transitory computer readable storage medium stores the following programs, modules and data structures, or a subset thereof:

Operating System 310 that includes procedures for handling various basic system services and for performing hardware dependent tasks;

Network Communication Module (or instructions) 312, for connecting Data-Collection Server System 106 to other computers (e.g., Client System 102, Organizer System 103, Remote Storage System 108, and/or Coordinating Server System 109) via one or more Network Interfaces 304 (wired or wireless) and one or more Communication Networks 120 (FIG. 1), such as the Internet, other wide area networks, local area networks, metropolitan area networks, and so on;

Data Intake Module 130, for receiving campaign-feedback data that indicates user interaction with messages sent to the users as part of one or more message campaigns (e.g., message campaigns initiated by Marketing Module 135);

Remote Storage Module 132, for controlling the flow of data to and from Remote Storage System 108;

Analytics Module 134, for analyzing campaign-feedback data and campaign-tracking data that is indicative of user interactions with messages sent out as part of a message campaign;

Marketing Module 135, for running message campaigns, including:

Message Campaign Control Module 320, for controlling delivery of messages in a message campaign based on Message Campaign Definitions 322 and for directing the storage of campaign-tracking data that is indicative of user interactions with messages in a message campaign; and Message Campaign Definitions 322, including rules for generating messages in a message campaign based on parameters of the message campaign, data retrieved from external sources (e.g., weather, time of day, upcoming holidays), and feedback from messages sent out as part of a message campaign;

User Profile Storage 136, including one or more profiles 330 for one or more users, with a respective User Profile 330-1 optionally comprising:

Unique ID 332-1 that is used to associate sensitive information such as personally identifiable information in User Profile 330 with information corresponding to the user that is received from Remote Storage System 108 (in some embodiments this identifier is globally unique meaning that the same person is uniquely assigned an identifier and this identifier is used across a plurality of messaging campaigns that in which the respective person is participating);

Name 334 of the user for use in personalizing messages in a message campaign;

Contact Information 335 such as an email address, phone number, social network identifier, or the like, for addressing messages to the user as part of a message campaign;

User Demographics 336 for the user (e.g., age, geographic location, income level, gender, ethnicity, etc.) for determining a grouping of the user for analysis purposes; and/or User Preferences/Settings/Status 338 for personalizing messages sent to the user in a message campaign and/or selecting messages to deliver to the user as part of message campaigns;

Local Data Storage 138, optionally including one or more of Raw Campaign-Tracking Data 340 (e.g., data that indicates user interaction with messages in a message campaign that has not been aggregated and can be used to run generate newly generated analytics that are not predefined) and Pre-Aggregated Campaign-Tracking Data 342 (e.g., data that indicates user interaction with messages in a message campaign that has been aggregated so that it can be used to run one or more predefined analytics).

In some embodiments, Marketing Module 135 (or another module within Data-Collection Server System 106) performs one or more of the functions of a message transfer agent "MTA" or other form of electronic/digital message sending system that communicates electronic/digital messages to end users, such as the message transfer agents described in U.S. Pat. No. 7,698,462, filed Oct. 22, 2007; U.S. Pat. Pub. No. 2010/0250477, filed Mar. 31, 2009; U.S. patent application Ser. No. 13/451,458, filed Apr. 19, 2012; and U.S. patent application Ser. No. 13/705,135, filed Dec. 4, 2012, all of which are hereby incorporated by reference in their entirety.

Each of the above identified elements may be stored in one or more of the previously mentioned memory devices, and corresponds to a set of instructions for performing a function described above. The above identified modules or programs (e.g., sets of instructions) need not be implemented as separate software programs, procedures or modules, and thus various subsets of these modules may be combined or otherwise re-arranged in various embodiments. In some embodiments, Memory 306 optionally stores a subset of the modules and data structures identified above. Furthermore, Memory 306 optionally stores additional modules and data structures not described above.

Although FIG. 3 shows a "Data-Collection Server System" 106, FIG. 3 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement Data-Collection Server System 106 and how features are allocated among them will vary from one implementation to another, and optionally depends in part on the amount of data traffic that the system must handle during peak usage periods as well as during average usage periods.

Figure 4:
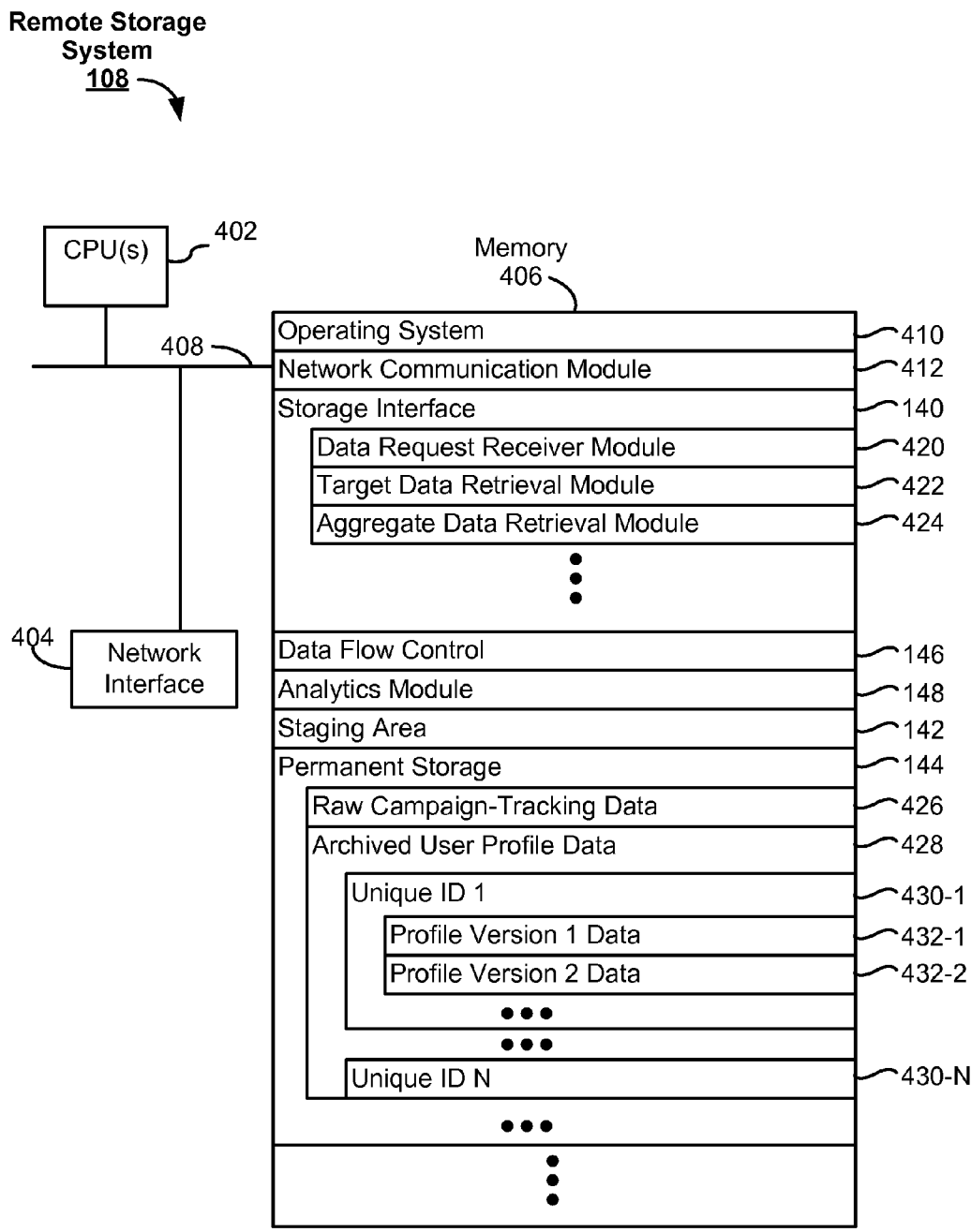
FIG. 4 is a block diagram illustrating a remote storage system, in accordance with some embodiments.

FIG. 4 is a block diagram illustrating a Remote Storage System 108 in accordance with some embodiments. Remote Storage System 108 includes one or more processing units CPU(s) 402, one or more network or other Communications Interfaces 404, Memory 406, and one or more Communication Buses 408 for interconnecting these components. Memory 406 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 406 optionally includes one or more storage devices remotely located from the CPU(s) 402. Memory 406, or alternatively the non-volatile memory device(s) within Memory 406, comprises a non-transitory computer readable storage medium. In some embodiments, Memory 406 or alternatively the non-transitory computer readable storage medium stores the following programs, modules and data structures, or a subset thereof:

Operating System 410 that includes procedures for handling various basic system services and for performing hardware dependent tasks;

Network Communication Module (or instructions) 412, for connecting Remote Storage System 108 to other computers (e.g., Client System 102, Organizer System 103, Data-Collection Server System 106, and/or Coordinating Server System 109) via one or more Network Interfaces 404 (wired or wireless) and one or more Communication Networks 120 (FIG. 1), such as the Internet, other wide area networks, local area networks, metropolitan area networks, and so on;

Storage Interface 140, for providing access to data stored at Remote Storage System 108 including:

Data Request Receiver Module 420, for receiving requests for data from Client System 102, Organizer System 103, Data-Collection Server System 106, and/or Coordinating Server System 109;

Target Data Retrieval Module 422, for retrieving data that matches predefined criteria (e.g., retrieving campaign-tracking information for particular users based on a request that includes unique identifiers for the users);

Aggregate Data Retrieval Module 424, for retrieving aggregated data for responding to requests for campaign reports (e.g., executing analytics on raw campaign-tracking data stored in Permanent Storage 144 to provide an analysis of patterns of user interaction with messages in message campaigns);

Data Flow Control 146, for directing the transfer of data between Staging Area 142 and Permanent Storage 144;

Analytics Module 148, for executing queries and running other analytics on data retrieved from Permanent Storage 144, for use in generating reports (e.g., campaign reports or message-interaction reports) that provide quantitative information about the data stored in Permanent Storage 144;

Staging Area 142, for receiving data provided by Data-Collection Server System(s) 106, Client System(s) 102, Organizer System(s) 103, and/or Coordinating Server System 109 before it is transferred to Permanent Storage 144 by Data Flow Control 146 and for storing data to be retrieved directly by Data-Collection Server System(s) 106, Client System(s) 102, Organizer System(s) 103, and/or Coordinating Server System 109 after it is transferred from Permanent Storage 144 by Data Flow Control 146;

Permanent Storage 144, storing:
   Raw Campaign-Tracking Data 426 (e.g., data that indicates user interaction with messages in a message campaign that has not been aggregated and can be used to run newly generated analytics that are not predefined); and
   Archived User Profile Data 428, including data from which a plurality of different versions of a user profile for one or more users can be generated, for a respective user, Unique User ID 430-1 is stored in conjunction with data from which a plurality of different versions of the profile for the user can be generated (e.g., Profile Version 1 Data 432-1, Profile Version 2 Data 432-2, etc.).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, Memory 406 optionally stores a subset of the modules and data structures identified above. Furthermore, Memory 406 optionally stores additional modules and data structures not described above.

Although FIG. 4 shows a "Remote Storage System" 108, FIG. 4 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 4 could be implemented on single servers and single items could be implemented by one or more servers. The actual number of servers used to implement Remote Storage System 108 and how features are allocated among them will vary from one implementation to another, and optionally depends in part on the amount of data traffic that the system must handle during peak usage periods as well as during average usage periods.

Figure 5:
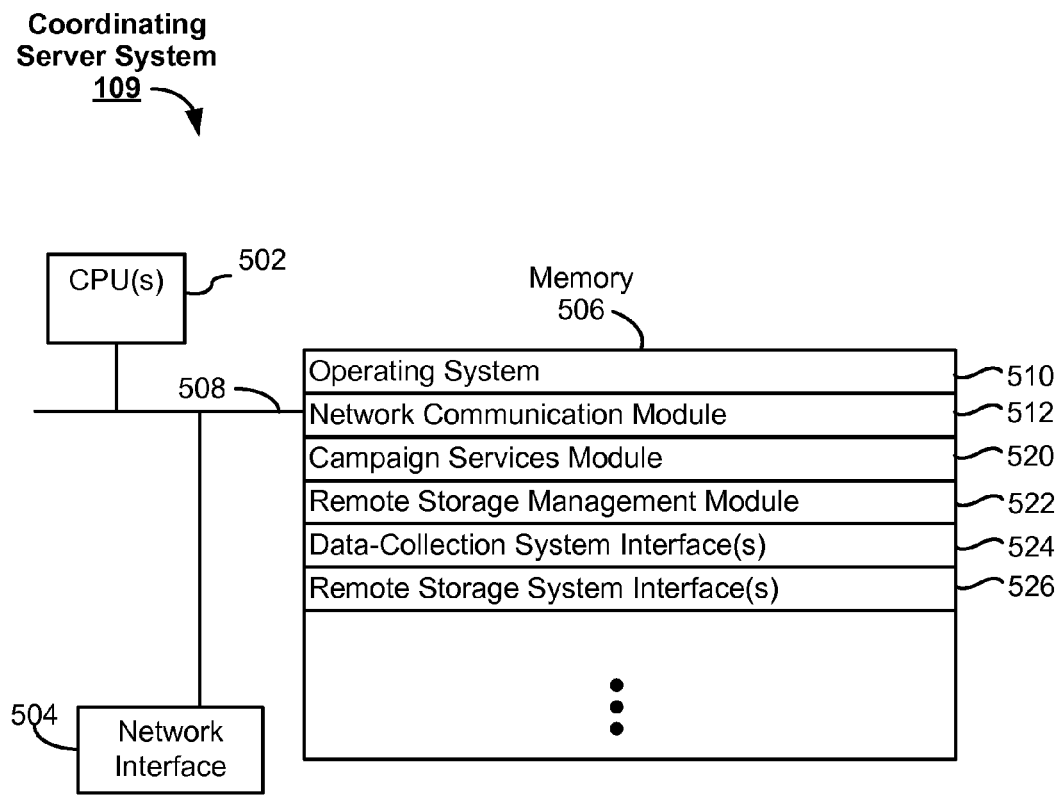
FIG. 5 is a block diagram illustrating a coordinating server system, in accordance with some embodiments.

FIG. 5 is a block diagram illustrating a Coordinating Server System 109 in accordance with some embodiments. Coordinating Server System 109 includes one or more processing units CPU(s) 502, one or more network or other Communications Interfaces 504, Memory 506, and one or more Communication Buses 508 for interconnecting these components. Memory 506 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 506 optionally includes one or more storage devices remotely located from the CPU(s) 502. Memory 506, or alternatively the non-volatile memory device(s) within Memory 506, comprises a non-transitory computer readable storage medium. In some embodiments, Memory 506 or alternatively the non-transitory computer readable storage medium stores the following programs, modules and data structures, or a subset thereof:

Operating System 510 that includes procedures for handling various basic system services and for performing hardware dependent tasks;

Network Communication Module (or instructions) 512, for connecting Coordinating Server System 109 to other computers (e.g., Client System 102, Organizer System 103, Data-Collection Server System 106, and/or Remote Storage System 108) via one or more Network Interfaces 504 (wired or wireless) and one or more Communication Networks 120 (FIG. 1), such as the Internet, other wide area networks, local area networks, metropolitan area networks, and so on;

Campaign Services Module 520, for setting parameters within which one or more Data-Collection Server System(s) 106 operate (e.g., by providing license authentication that enables different message campaign service levels by adjusting the size or speed of message campaigns) and monitoring usage of Data-Collection Server Systems 106;

Remote Storage Management Module 522, for managing data stored at Remote Storage System 108, adjusting the amount and quality of storage allocated to different Data-Collection Server Systems 106, and, optionally, monitoring usage of Data-Collection Server Systems 106;

Data-Collection Server System Interface(s) 524, for communicating with Data-Collection Server Systems 106 and performing administrative functions associated with Data-Collection Server Systems 106 (e.g., providing technical support and providing software and firmware updates); and Remote Storage System Interface(s) 526, for communicating with Remote Storage System 108 and performing administrative functions associated with Remote Storage System 108 (e.g., providing software and firmware updates and managing data stored at Remote Storage System 108).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, Memory 506 optionally stores a subset of the modules and data structures identified above. Furthermore, Memory 506 optionally stores additional modules and data structures not described above.

Although FIG. 5 shows a "Coordinating Server System" 109, FIG. 5 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 5 could be implemented on single servers and single items could be implemented by one or more servers. The actual number of servers used to implement Remote Coordinating Server System 109 and how features are allocated among them will vary from one implementation to another, and optionally depends in part on the amount of data traffic that the system must handle during peak usage periods as well as during average usage periods.

Figure 6:
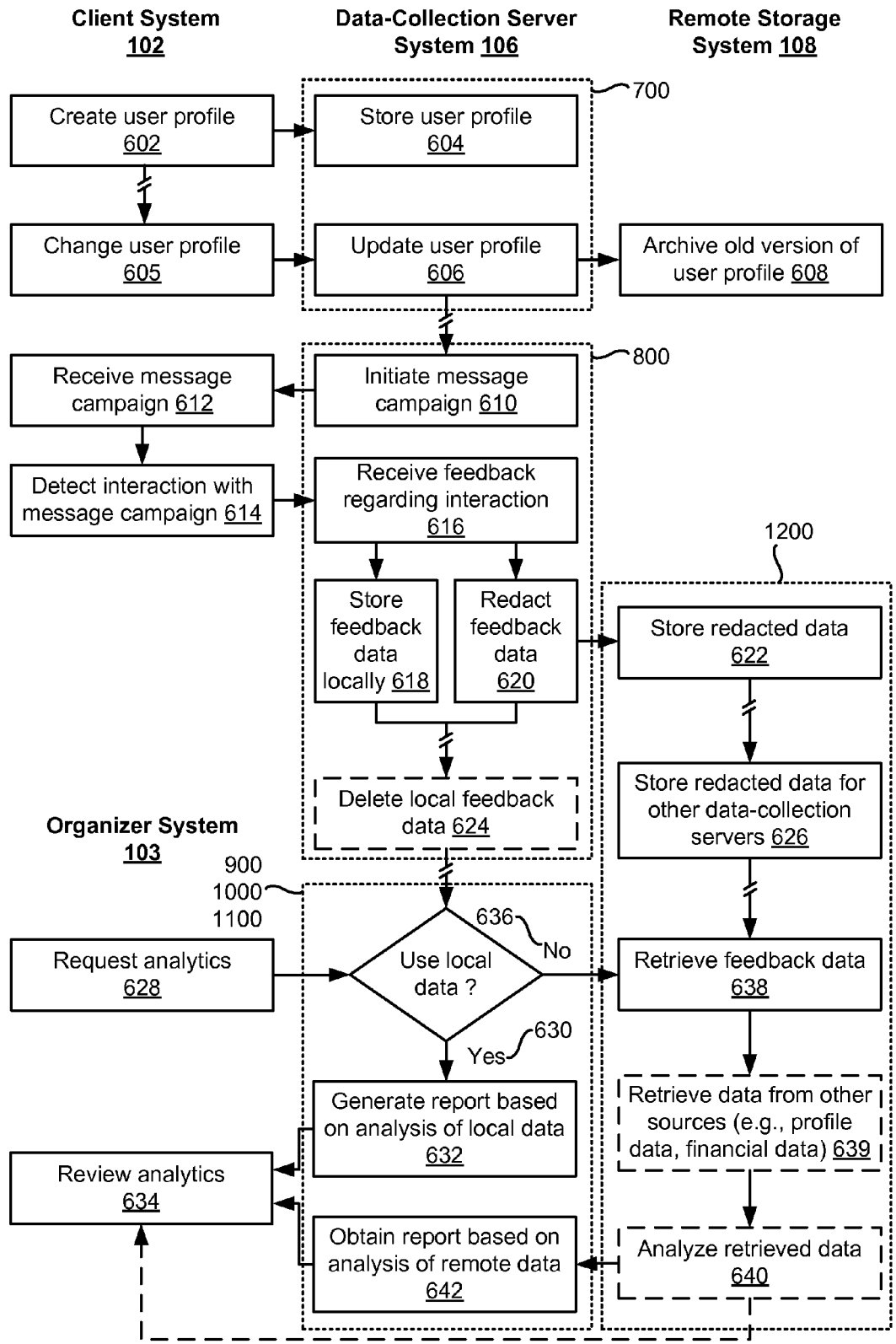
FIG. 6 includes a flow chart illustrating communications between a client system, an organizer system, a data-collection server system, and a remote storage system collecting and processing data related to one or more message campaigns, in accordance with some embodiments.

FIG. 6 shows a flowchart representing communications between one or more Client Systems 102, one or more Organizer Systems 103, one or more Data-Collection Server Systems 106, and a Remote Storage System 108 when analyzing user interaction with a message campaign. Message campaign recipients are, in some circumstances, client devices associated with users who have signed up to receive message campaigns (e.g., promotional emails or other electronic messages that provide information to users about goods and/or services or other information). In some embodiments, a user explicitly creates (602) a user profile. In some embodiments, a user profile is generated based on information collected from a user while the user is interacting with an organizer of the message campaign (e.g., making a purchase, responding to a message in a marketing campaign, etc.). In some embodiments, an entity that controls Data-Collection Server System 106 acquires user profiles from an external source other than Client Systems 102. For example, in some embodiments, the user profiles are acquired from public domain sources (e.g., on line directories), or private sources (e.g., the entity pays another entity for a customer list, the entity exchanges a first customer list with another entity for a second customer list). In some embodiments, when a new user profile is generated, the new user profile is stored (604) at a Data-Collection Server Systems 106. In some embodiments, data about user interactions with one or more message campaigns is provided to Data-Collection Server System 106, which creates a user profile based on the data.

In some embodiments, a user profile for a particular user already exists. In this case, information generated at Client System 102 represents an update to an existing user profile stored either at Data-Collection Server System 106 or at Remote Storage System 108. In some embodiments, when Client System 102 receives or detects (605) information that corresponds to a change in an existing user profile, that information is transmitted to Data-Collection Server System 106. In some embodiments, the user profile stored at Data-Collection Server System 106 is updated (606) and the old version of the profile is transmitted to the Remote Storage System 108, and Remote Storage System 108 archives (608) the old version of the profile (or archives information from which the old version of the profile can be reconstructed, such as a delta between the old version of the profile and the current or prior version of the profile). A more detailed discussion of using archived versions of user profiles by correlating message interaction data with prior versions of user profiles is discussed in greater detail below with reference to method 700.

In some embodiments, Data-Collection Server System 106 initiates (610) a message campaign (e.g., at the direction of a message campaign organizer via an Organizer System 103). Initiation of a message campaign results in a plurality of messages being sent to a plurality of Client Systems 102. Temporally, in some embodiments a message campaign last less than 1 day, less than a week, less than a month, less than a season, less than a year or some other specified amount of times. In some embodiments a message campaign does not have a predetermined termination time but rather is driven by a sales objective, such that that campaign terminates when the sales objective is achieved. In some embodiments a message campaign does not have a predetermined termination time and is terminated or refined while the message campaign is in process in accordance with the judgment of a campaign administrator.

One or more Client Systems 102 receive (612) one or more messages as part of the message campaign. Once a particular message in the message campaign has been received by a respective Client System 102, the respective Client System 102 detects (614) a user's interaction with the respective message that is part of the message campaign. For example, the interaction of the user includes one or more of: opening the message, deleting the message, marking the message as spam, unsubscribing from future message campaigns, interacting with content of the message such as by following a hyperlink in the message, purchasing a product or service offered in the message campaign, or the like. One or more Client Systems 102 collect data about user's interaction with the message and transmit the collected data to Data-Collection Server System 106.

In some embodiments, Data-Collection Server System 106 receives (616) feedback from a plurality of Client Systems 102 that includes data about the user interaction with one or more messages in the message campaign. In some embodiments, the received feedback data is stored (618) locally at Data-Collection Server System 106 for use in analyzing user interactions with message campaigns. In some embodiments, the received feedback data is redacted (620) by removing information that is not necessary to analyze user interactions with message campaigns and/or is sensitive data (e.g., personally identifiable information such as names, addresses, payment credentials, billing information, etc.) to create redacted data. In some embodiments, the redacted data is then stored (622) at the Remote Storage System 108 for later retrieval. In some embodiments, after the redacted data has been stored at Remote Storage System 108, Data-Collection Server System 106 deletes (624) the corresponding locally stored feedback data, so as to conserve space at Data-Collection Server System 106. In some embodiments, the locally stored feedback data is deleted in accordance with a predefined schedule (e.g., all feedback data over 7 days old is deleted). In some embodiments, the Remote Storage System 108 also stores (626) redacted data for other data collection server systems (e.g., multiple different Data-Collection Server Systems 106 all store feedback data at Remote Storage System 108). A more detailed discussion of storing campaign-tracking data at a remote storage system is discussed in greater detail below with reference to method 800.

In some embodiments, Organizer System 103 requests (628) analytics (e.g., analysis of user interactions with message campaigns initiated by Organizer System 103) from Data-Collection Server System 106. The request for analytics is transmitted to Data-Collection Server System 106. In response to the request, Data-Collection Server System 106 determines whether or not to respond to the request using data stored locally on Data-Collection Server System 106. In accordance with a determination to respond to the request using (630) locally stored data, Data-Collection Server System 106 generates (632) a report based on analysis of locally stored data and, optionally, other data retrieved from other sources (e.g., user profile data, a time of day, time of year, weather, sales data, etc.). In some embodiments, the other data includes environmental reference data such as financial market data. For example, for a report that includes information indicating a click-through rate of recipients of a message campaign who are following any company in the S&P 500, Data-Collection Server System 106 would determine stock preference data from user profiles and combine the stock preference information with information from a financial institution indicating which companies are in the S&P 500 and feedback data from one or more message campaigns to generate the requested report.

After generating the report, Data-Collection Server System 106 then transmits the report to Organizer System 103. Organizer System 103 reviews (634) the report received from Data-Collection Server System 106 and, optionally, uses the results of the report to create future message campaigns and/or modify ongoing message campaigns so that the message campaigns are more effective and helpful for recipients. In accordance with a determination not to respond to the request using (636) locally stored data (e.g., because locally stored data is not available or because Data-Collection Server System 106 is configured to use remotely stored data to respond to the request), Data-Collection Server System 106 requests feedback data from Remote Storage System 108.

In response to receiving a request for feedback data, Remote Storage System 108 retrieves (638) the requested feedback data and, optionally, analyzes (640) the feedback data. In some embodiments the feedback data retrieved by Remote Storage System 108 is analyzed in conjunction with data retrieved (639) from other sources (e.g., a time of day, time of year, weather, sales data, time zone, profile data etc.). In some embodiments, Remote Storage System 108 prepares a report with the results of the analysis of the feedback data. In some embodiments, Remote Storage System 108 prepares a preliminary analysis (e.g., by aggregating data in a manner that enables Data-Collection Server System 106 to generate a report) and provides the preliminary analysis to Data-Collection Server System 106 for further processing. In some circumstances, Remote Storage System 108 performs similar operations for a plurality of different Data-Collection Server Systems 106. A more detailed discussion of controlling access to feedback data from multiple different data-collection server systems is discussed in greater detail below with reference to method 1200.

After requesting feedback data from Remote Storage System 108, Data-Collection Server System 106 obtains (642) a report based on the analysis of the remote data (e.g., by processing the information received from Remote Storage System 108 to generate a report or by using the information received from Remote Storage System 108 as the report). Data-Collection Server System 106 then transmits the report to Organizer System 103. Organizer System 103 reviews (634) the report received from Data-Collection Server System 106 and, optionally, uses the results of the report to create future message campaigns and/or modify ongoing message campaigns so that the message campaigns are more effective and helpful for recipients. In some embodiments, Remote Storage System 108 receives a request from the organizer system 103 via Data-Collection Server System 106, analyzes the requested data, and responds to Organizer System 103 directly, without sending the resulting data and/or report to Data-Collection Server System 106. A more detailed discussion of analyzing message campaign feedback data that is stored in a remote storage system is discussed in greater detail below with reference to methods 900, 1000, and 1100.

Figure 7:
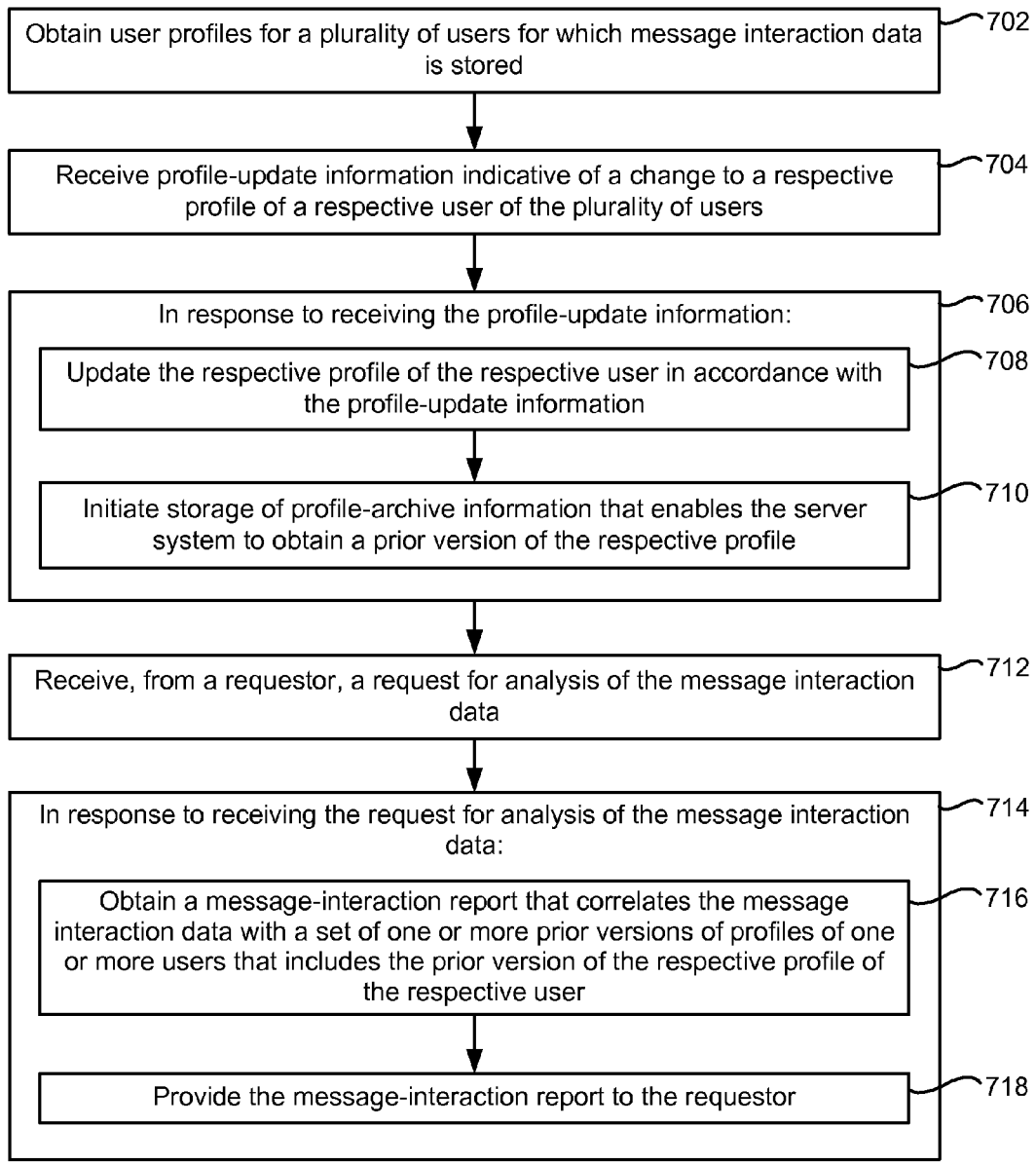
FIG. 7 includes a flow chart illustrating a method for correlating message interaction data with prior versions of user profiles, in accordance with some embodiments.

FIG. 7 includes a flowchart representing a method 700 for correlating message interaction data with prior versions of user profiles, according to certain embodiments. In particular, method 700 describes in greater detail operations performed at a server system (e.g., Data-Collection Server System 106-1 as shown in FIG. 1), as discussed above in FIG. 6. Method 700 is, optionally, governed by instructions that are stored in a non-transitory computer readable storage medium and that are executed by one or more processors of one or more servers (e.g., Data-Collection Server System 106, FIG. 3). Each of the operations shown in FIG. 700 optionally corresponds to instructions stored in a computer memory or computer readable storage medium (e.g., memory 306 of Server 106 in FIG. 3). The computer readable storage medium optionally includes a magnetic or optical disk storage device, solid state storage devices such as Flash memory, or other non-volatile memory device or devices. The computer readable instructions stored on the computer readable storage medium optionally include one or more of: source code, assembly language code, object code, or other instruction format that is interpreted by one or more processors. Some operations in method 700 are, optionally, combined and/or the order of some operations are, optionally, changed.

In some embodiments, a server system (e.g., Data-Collection Server System 106) obtains (702) user profiles for a plurality of users for which message interaction data is stored. In some embodiments, the user profiles are stored at the server system (e.g., stored user profile 330-1 as shown in FIG. 3). In some embodiments, the server system maintains storage of the user profiles at a remote storage system (e.g., Remote Storage System 108). In some embodiments, the users are users that receive message campaigns at the direction of the server system, a respective message campaign of the plurality of message campaigns includes one or more messages addressed to the plurality of users, and the message interaction data includes campaign-feedback data that is indicative of user interaction with the messages transmitted to the plurality of client devices as part of the plurality of message campaigns. For example, a message campaign includes a set of emails to customers of an airline advertising upcoming flight deals that are being offered by the airline, with hyperlinks to webpages that initiate a process for purchasing plane tickets using the flight deals.

In some embodiments, the server system receives (704) profile-update information indicative of a change to a respective profile of a respective user of the plurality of users (e.g., a user explicitly changes a field of a user profile, or a user performs an operation that is tracked as part of the user profile, such as purchasing over $500 of goods or services). In response to receiving the profile-update information (706), the server system updates (708) the respective profile of the respective user in accordance with the profile-update information (e.g., updating user profile 606 as shown in FIG. 6). The server system then initiates (710) storage of profile-archive information that enables the server system to obtain a prior version of the respective profile (e.g., a version of the respective profile that existed before the respective profile was updated in accordance with the profile-update information). In some embodiments, the server system stores a prior version of the profile. In some embodiments, the servers system stores a delta between the prior version of the profile and the updated version of the profile or other information that enables reconstruction of the prior version of the profile. Storing information from which prior versions of user profiles can be recreated enables the server system to determine how changes in user profiles correspond to changes in user behavior which can be very helpful in generating more effective and helpful message campaigns.

In some embodiments, a remote storage system (e.g., Remote Storage System 108) that is separate and distinct from the server system stores profile-archive information that enables the server system to obtain multiple prior versions of profiles for each of a plurality of different users. In some embodiments, the prior version of the respective profile includes an indication of a time range for which the prior version of the respective profile was a current version of the respective profile (e.g., the profile-archive information indicates a date on which the respective profile was updated, so that the server system can determine that the user's rewards status was X from August 2012 to August 2013). Storing prior versions of user profiles for a large number of users will take up a large amount of storage space, thus it is advantageous to store the information that enables the prior versions of the user profiles to be reconstructed in a remote storage system that can be more easily scaled than a local storage system.

In some embodiments, a current version of the respective profile for the respective user is stored in a local storage system and updating the respective profile for the respective user includes updating the current version of the respective profile at the local storage system. In some embodiments, the profile-archive information excludes personally identifiable information (e.g., names, social security numbers, credit card information, billing address, etc.) and/or other sensitive user data. Thus, in some embodiments, a complete copy of the respective profile is not stored at a remote storage system (e.g., Remote Storage System 108) so as to ensure that personally identifiable information about users is not inadvertently compromised by the remote storage system.

In some embodiments, after updating the respective profile of the respective user, the server system receives (712), from a requestor, (e.g., a user of the server system, or a user of a client device that is in communication with the server system) a request for analysis of the message interaction data. In response to receiving the request for analysis of the message interaction data (714) the server system obtains (716) a message-interaction report that correlates the message interaction data with a set of one or more prior versions of profiles of one or more users that includes the prior version of the respective profile of the respective user. In some embodiments, obtaining the message-interaction report includes retrieving data from the remote storage system and generating the message-interaction report by running one or more queries against the retrieved data. In some embodiments, obtaining the message-interaction report includes transmitting one or more queries to the remote storage system and receiving results of the queries from the remote storage system.

In some embodiments, the message-interaction report includes information correlating the one or more prior versions of profiles of a respective user with historical data that corresponds to the respective user (e.g., a respective user's reward status 6 months ago is correlated with the user's engagement with message campaigns from six months ago). In some embodiments, the message-interaction report includes information derived by application of the one or more prior versions of profiles of one or more users and historical data that corresponds to the one or more users against a pattern classification technique. In some embodiments, the pattern classification technique includes a support vector machine, neural network, or clustering (e.g., user reward status is clustered based on purchase size to determine relationship between reward status and purchase size across the users). In some embodiments, the pattern classification technique is trained on all or a portion of the message interaction data at a time prior to receiving the profile-update information.

In some embodiments, the message-interaction report includes information derived by application of the one or more prior versions of profiles of the plurality of users and historical data that corresponds to the plurality of users against a pattern classification technique. In some embodiments, the pattern classification technique includes a support vector machine, neural network, or clustering (e.g., user reward status is clustered based on purchase size to determine relationship between reward status and purchase size across the users). In some embodiments, the pattern classification technique is trained on all or a portion of the message interaction data at a time prior to receiving the profile-update information.

In some embodiments, the message-interaction report includes information correlating changes in a user profile of a respective user over time with changes in behavior of the respective user over time (e.g., the message-interaction report identifies changes in the user's level of engagement with message campaigns and correlates the changes in the user's level of engagement with changes in the respective user's reward status over the same time period). In some embodiments, the message-interaction report includes information derived by application of changes in the profile of one or more users over time and changes in behavior of one or more users over time against a pattern classification technique. In some embodiments, the pattern classification technique includes a support vector machine, neural network, or clustering. In some embodiments, the pattern classification technique is trained on all or a portion of the message interaction data at a time prior to receiving the profile-update information.

In some embodiments, the message-interaction report includes information derived by application of changes in the profile of a plurality of users over time and changes in behavior of the plurality of users over time against a pattern classification technique. In some embodiments, the pattern classification technique includes a support vector machine, neural network, or clustering (e.g., user reward status is clustered based on purchase size to determine relationship between reward status and purchase size across the users). In some embodiments, the pattern classification technique is trained on all or a portion of the message interaction data at a time prior to receiving the profile-update information. In some embodiments, after the message-interaction report has been obtained (e.g., generated by the server system or retrieved from a remote storage system) the server system provides (718) the message-interaction report to the requestor.

Exemplary pattern classification techniques are disclosed in Duda, Richard, Pattern Classification, 2nd edition, New York, John Wiley & Sons, Inc., 2000, which is hereby incorporated by reference. In some embodiments, the pattern classification techniques described above include one or more of a two-way contingency table, three-way contingency table, generalized linear model, logistic regression, loglinear model for a contingency table, multi-category logit model, or model for a matched pair. See, for example, Agresti, Alan, *An Introduction to Categorical Data Analysis*, New York, John Wiley & Sons, Inc., 1996, which is hereby incorporated by reference.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900, 1000, 1100 and/or 1200) are also applicable in an analogous manner to method 7 described above with respect to FIG. 700. For example, the messages, message campaigns, campaign-feedback data, and campaign-tracking data described above with reference to method 700 optionally have one or more of the characteristics of the messages, message campaigns, campaign-feedback data, and campaign-tracking data described herein with reference to other methods described herein (e.g., methods 800, 900, 1000, 1100 and/or 1200). For brevity, these details are not repeated here.

Figure 8:
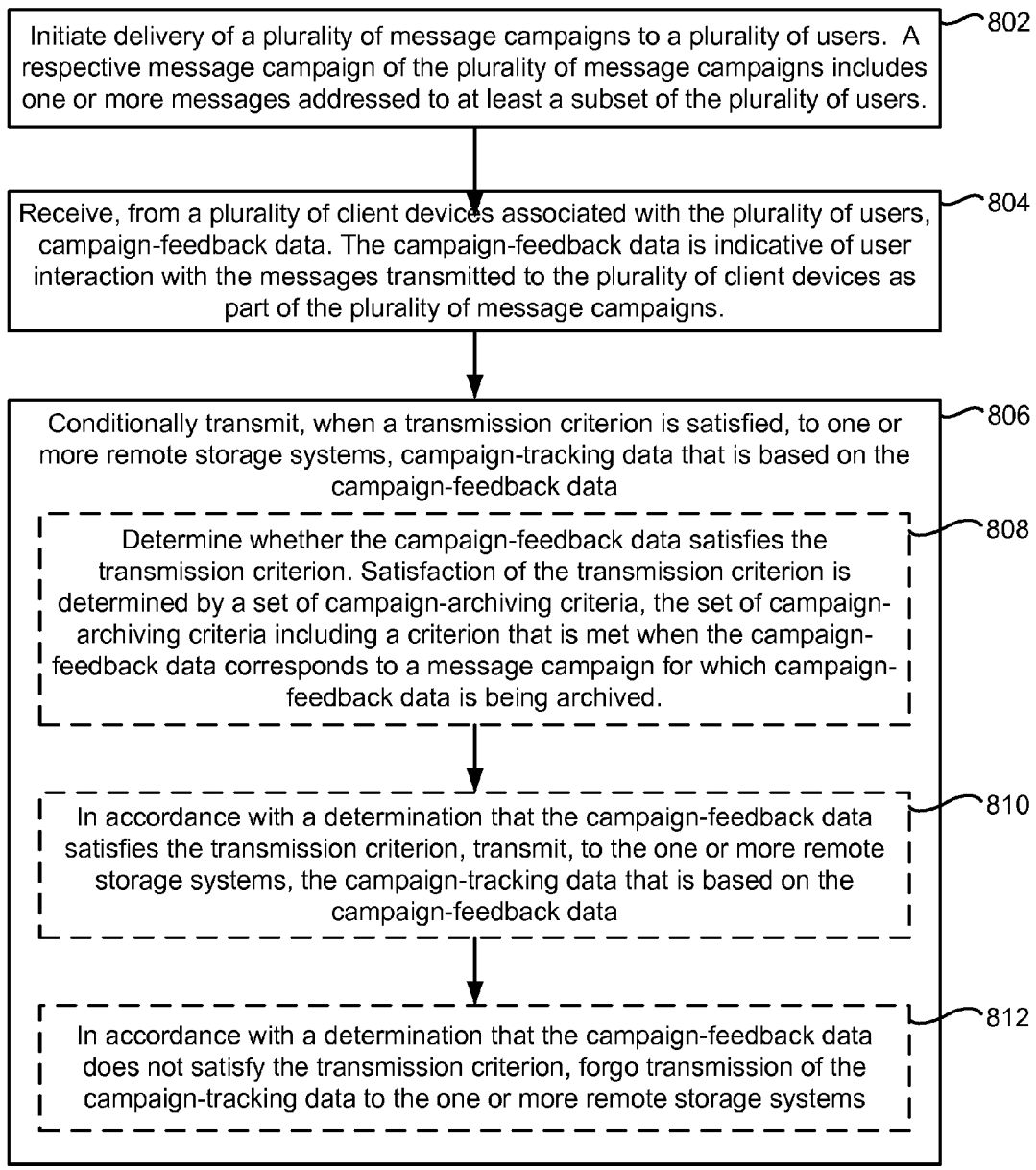
FIG. 8 includes a flow chart illustrating a method for storing campaign-tracking data at a remote storage system, in accordance with some embodiments.

FIG. 8 includes a flowchart representing a method 800 for storing campaign-tracking data at a remote storage system, according to certain embodiments. In particular, method 800 describes in greater detail operations performed at a server system (e.g., Data-Collection Server System 106-1 as shown in FIG. 1), as discussed above in FIG. 6. Method 800 is, optionally, governed by instructions that are stored in a non-transitory computer readable storage medium and that are executed by one or more processors of one or more servers (e.g., Data-Collection Server System 106, FIG. 3). Each of the operations shown in FIG. 8 optionally corresponds to instructions stored in a computer memory or computer readable storage medium (e.g., memory 306 of Server 106 in FIG. 3). The computer readable storage medium optionally includes a magnetic or optical disk storage device, solid state storage devices such as Flash memory, or other non-volatile memory device or devices. The computer readable instructions stored on the computer readable storage medium optionally include one or more of: source code, assembly language code, object code, or other instruction format that is interpreted by one or more processors. Some operations in method 800 are, optionally, combined and/or the order of some operations are, optionally, changed.

In some embodiments, a server system (e.g., Data-Collection Server System 106) initiates (802) delivery of a plurality of message campaigns to a plurality of users, (e.g., customers) where a respective message campaign of the plurality of message campaigns includes one or more messages addressed to at least a subset of the plurality of users (e.g., initiating a message campaign 610 as shown in FIG. 6). In some embodiments, the server system receives (804), from a plurality of client devices associated with the plurality of users, campaign-feedback data. The campaign-feedback data is indicative of user interaction with the messages transmitted to the plurality of client devices as part of the plurality of message campaigns (e.g., receiving feedback regarding interaction 616, as shown in FIG. 6). In some embodiments, a respective message campaign of the plurality of message campaigns includes messages sent using a plurality of different message types (e.g., messages sent as part of the respective message campaign include two or more of SMS messages, emails, social networking messages, etc.).

In some embodiments, after receiving the campaign-feedback data, the server system stores at least a subset of the campaign-tracking data in a local storage system (e.g., storing feedback data locally 618, as shown in FIG. 6). In some embodiments the server system deletes respective campaign-tracking data stored in the local storage system (e.g., deleting feedback data locally 624, as shown in FIG. 6) in accordance with predetermined criteria (e.g., delete campaign-tracking data that is older than 7, 14, 28, 45 days, or some reasonable time period, or delete old campaign-tracking data when the amount of campaign-tracking data stored in the local storage system exceeds an amount of storage that is allotted in the local storage system for storing campaign-tracking data). Deleting campaign-tracking data stored in the local storage system conserves storage space on the local storage system and reduces the need for a large amount of storage at the server system, thereby reducing the cost of the server system. Additionally, storing campaign-feedback data in the local storage system improves performance of the server system by making recent data available for analysis by the server system (e.g., to determine which types of message campaign have been the most effective in the last several days) and adjust future message campaigns based on that data.

In some embodiments, the server system receives a request for a report generated using respective campaign-tracking data. In response to receiving the request, the server system determines if the respective campaign-tracking data is available in the local storage system (e.g., Local Storage 138 in FIGS. 1, 3). In accordance with a determination that the respective campaign-tracking data is available (e.g., Yes 630 as shown in FIG. 6) in the local storage system, the server system retrieves the respective campaign tracking data from the local storage system and generates the report based at least in part on the respective campaign-tracking data from the local storage system. In accordance with a determination that the respective campaign-tracking data is not available (e.g., No 636 as shown in FIG. 6) in the local storage system, (e.g., because the respective campaign-tracking data has been deleted from the local storage system) the server system retrieves the respective campaign tracking data from the remote storage system and generates the report based at least in part on the respective campaign-tracking data from the remote storage system. Thus, in some embodiments, if the date range of the query is outside of a date range for which local data is stored in a form that can be used to respond to the query (e.g., as raw data or as pre-aggregated data that is aggregated in a way that enables it to be used to respond to the query), the data is retrieved from the remote storage system. For example, a query across multiple campaigns that includes data more than one week old and for which data has not been pre-aggregated cannot be performed using local data if raw local data (e.g., data from which a query across multiple campaigns could be generated) is discarded after a week. For example if data has been aggregated by country (e.g., U.S., Canada, Mexico, etc.), the aggregated data cannot be used to determine the differences in interaction with a message campaign between message campaign recipients in different states within the same country.

In some embodiments, the campaign-tracking data includes at least a subset of the campaign-feedback data. In some embodiments, after receiving the campaign-feedback data the server system generates the campaign-tracking data based on the campaign-feedback data (e.g., generate report based on analysis of local data 632 as shown in FIG. 6). In some embodiments, the server system generates the campaign-tracking data by performing one or more of: removing personally identifiable information (e.g., removing personally identifiable information from data 620, as shown in FIG. 6) from the campaign-feedback data (e.g., removing real names, passwords, credit card information, residential addresses and the like), adding information stored at a local storage system that corresponds to the campaign-feedback data (e.g., adding user reward status or information about a user's previous responses to campaigns, or the like), combining the campaign-feedback data with data received from other sources that are related to the one or more campaigns (e.g., social networking feeds related to the one or more campaigns, electronic messages such as SMS and MMS messages related to the one or more campaigns), normalizing campaign-feedback data received from a plurality of different sources to a common format used for the campaign-tracking data (e.g., changing the order of data, appending unique identifiers based on a particular user from which the campaign-feedback data was received, and the like), and removing information that is not useful for tracking user interaction with the one or more campaigns. (e.g., removing static information such as the version number of client software or the like).

In some embodiments, after receiving the campaign-feedback data, the server system conditionally transmits (806), when a transmission criterion is satisfied, to one or more remote storage systems, campaign-tracking data that is based on the campaign-feedback data. In some embodiments, while conditionally transmitting campaign tracking data, the server system determines (808) whether the campaign-feedback data satisfies the transmission criterion. Satisfaction of the transmission criterion is determined by a set of campaign-archiving criteria and the set of campaign-archiving criteria include, but are not necessarily limited to, a criterion that is met when the campaign-feedback data corresponds to a message campaign for which campaign-feedback data is being archived. Other possible campaign-archiving criteria include: whether campaign archiving is enabled, whether the received campaign-feedback data is the type of data that has been selected for archiving. In some embodiments, the set of campaign-archiving criteria can include any number of requirements but only require a certain number or percentage of them to be met before archiving campaign data. In some embodiments, certain criteria are mandatory and others are not-mandatory such that for the campaign data to be archived all of the mandatory criteria must be satisfied and a certain number of non-mandatory criteria (or a certain percentage) must be satisfied. Conditionally transmitting data to a remote storage system enables the server system to control which data is sent to the remote storage system, so as to conserve storage space at the remote storage system and/or so as to prevent sensitive information from being transmitted to the remote storage system.

In accordance with a determination that the campaign-feedback data satisfies the transmission criterion, the server system transmits (810), to the one or more remote storage systems, the campaign-tracking data that is based on the campaign-feedback data. In some embodiments, the campaign-tracking data is the campaign-feedback data. In some embodiments, the campaign-tracking data includes an annotated version of the campaign-feedback data. In accordance with a determination that the campaign-feedback data does not satisfy the transmission criterion, the server system forgoes (812) transmission of the campaign-tracking data to the one or more remote storage systems.

In some embodiments, the conditionally transmitting performed by the server system comprises the server system determining whether the campaign-feedback data satisfies the transmission criterion, where the transmission criterion is a data transmission criterion. In accordance with a determination that the campaign-feedback data meets the data transmission criteria, (e.g., that a sufficient quantity of data has been collected or that the data has been collected for a sufficient amount of time) the server system transmits the campaign-tracking data to the remote storage system. In accordance with a determination that the campaign-feedback data does not satisfy the data transmission criteria, (e.g., that a sufficient quantity of data has not been collected and/or that the data has not been collected for a sufficient amount of time) the server system forgoes transmission of the campaign-tracking data to the remote storage system. (e.g., until a sufficient quantity of data has been collected or the data has been collected for a sufficient amount of time).

In some embodiments, the server system has a respective amount of allotted storage at the remote storage system. The server system monitors the quantity of campaign-tracking data that is transmitted to the one or more remote storage systems. In response to determining that the respective amount of allotted storage at the one or more remote storage systems is not sufficient to store all of the campaign-tracking data, the server system transmits, to the one or more remote storage systems, a request to increase the allotment of storage for storing the campaign-tracking data at the one or more remote storage systems. In some embodiments, a coordinating server system (e.g., Coordinating Server System 109) monitors the usage of the one or more remote storage system by the server system and automatically adjusts the allotted storage at the one or more remote storage systems for the server system.

In some embodiments, the campaign feedback-data is associated with sensitive user data (e.g., personally identifiable information such as a name, billing address, payment credentials, email address, and the like) of a set of one or more users that is available to the server system. In some embodiments, the campaign-tracking data includes information from the campaign-feedback data that is associated with the set of one or more users and excludes the sensitive user data (e.g., when generating the campaign-tracking data from the campaign-feedback data, the server system removes sensitive user data from the campaign-feedback data). In some embodiments, after transmitting the campaign-tracking data to the remote storage system, the server system receives a request to initiate a message campaign directed to users who meet campaign-targeting criteria (e.g., for a "win back" message campaign, the campaign-targeting criteria includes users who, at one point in time, had a high level of interaction with message campaigns but who have had a lower level of interaction with more recent message campaigns) and transmits a request to the remote storage system for campaign-targeting information enabling identification of users who meet the campaign-targeting criteria by the server system.

In some embodiments, in response to the request to initiate the message campaign, the server system receives the campaign-targeting information. The campaign-targeting information enables identification a plurality of users who meet the campaign-targeting criteria but does not include sensitive user data for the plurality of users (e.g., names and contact information for the plurality of users are not included in the campaign-targeting information because this information is not stored at the remote storage system). In some embodiments, after receiving the campaign-targeting information, the server system initiates a message campaign that is targeted to the plurality of users based on the campaign-targeting information and the sensitive user data. For example, the server system selects users to target with a marketing campaign based on unique identifiers of users from the campaign-targeting information received from the remote storage system and customizes the messages in the message campaign by inserting names of users and using user email addresses that are not included in the campaign-targeting information but are, instead, retrieved from local storage of the server system based on the unique identifiers included in the campaign-targeting information.

In some embodiments, a respective remote storage system (e.g., Remote Storage System 108) of the one or more remote storage systems has a plurality of performance levels and while using the respective remote storage system at a first performance level, the server system determines that a different performance level for the respective remote storage system is needed (e.g., determining that improved remote storage system performance is needed and increasing the performance level of the respective remote storage system or determining that the current level of remote storage system performance is not needed and that a lower level of performance would be acceptable and more cost-effective and decreasing the performance level of the respective remote storage system). In some embodiments, in response to the determination that a different performance level for the respective remote storage system is needed, the server system requests a change in performance level of the respective remote storage system from the first performance level to a second, different performance level. In some embodiments, the performance level of the respective remote storage system includes values for one or more of: an amount of storage space available at the respective remote storage system, a speed of read access to the respective remote storage system, a speed of write access to the respective remote storage system, and shared use of storage servers at the remote storage system (e.g., whether the server system has exclusive use of a cluster of storage servers at the remote storage system or whether usage of the cluster of storage servers is shared with one or more third-parties). In some embodiments, the request to change the performance level of the respective remote storage system is sent to the remote storage system. In some embodiments, the request to change the performance level of the remote storage system is sent to a coordinating server that coordinates service of the remote storage system for multiple data-collection server systems and the request is forwarded from the coordinating server system to the remote storage system.

In some embodiments, the server system has a set of message campaign capabilities, including one or more capabilities related to initiating message campaigns and one or more capabilities related to collecting campaign-feedback data. In some embodiments, the message campaign capabilities include one or more of: a rate at which messages can be sent as part of a message campaign, a number of users to which a message campaign can be directed, an amount of campaign-tracking or campaign-feedback data that can be stored locally or at a remote storage system. In some embodiments, before operating in accordance with a respective message campaign capability of the set of message campaign capability, the server system communicates with a coordinating server system (e.g., Coordinating Server System 109) to verify that the server system is authorized to operate in accordance with the respective message campaign capability. In some embodiments, in accordance with a determination that the server system is authorized to operate in accordance with the respective message campaign capability, the respective message campaign capability is enabled at the server system, while in accordance with a determination that the server system is not authorized to operate in accordance with the respective message campaign capability, the respective message campaign capability is disabled at the server system. In some embodiments, the coordinating server system manages message campaign capabilities for a plurality of different server systems that manage message campaigns and collect data related to the message campaigns. In some embodiments, the owner/operator of the coordinating server system sells or leases these server systems to customers for use in managing message campaigns and collecting data related to the message campaigns. In some embodiments, the server system is configured so that it can be remotely disabled if its license to perform message campaign capabilities has expired (e.g., because a marketer has not renewed a license to use message campaign software associated with the server system). Licensing server systems for different message campaign capabilities, enables the owner/operator of the coordinating server system to provide variable pricing for the server systems based on an expected amount of use of the server systems, which makes the server systems more affordable to message campaign organizers who send out smaller message campaigns. Additionally, licensing server systems for different message campaign capabilities enables the capabilities of server systems to be changed without changing the hardware of the server system. Thus, if a message campaign organizer needs to add message campaign capabilities to the server system, the message campaign organizer can do so by requesting activation of the additional message campaign capabilities by the owner/operator of the coordinating server system rather than replacing the server system.

It should be understood that the particular order in which the operations in FIG. 8 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1000, 1100 and/or 1200) are also applicable in an analogous manner to method 800 described above with respect to FIG. 8. For example, the messages, message campaigns, campaign-feedback data, and campaign-tracking data described above with reference to method 800 optionally have one or more of the characteristics of the messages, message campaigns, campaign-feedback data, and campaign-tracking data described herein with reference to other methods described herein (e.g., methods 700, 900, 1000, 1100 and/or 1200). For brevity, these details are not repeated here.

Figure 9A:
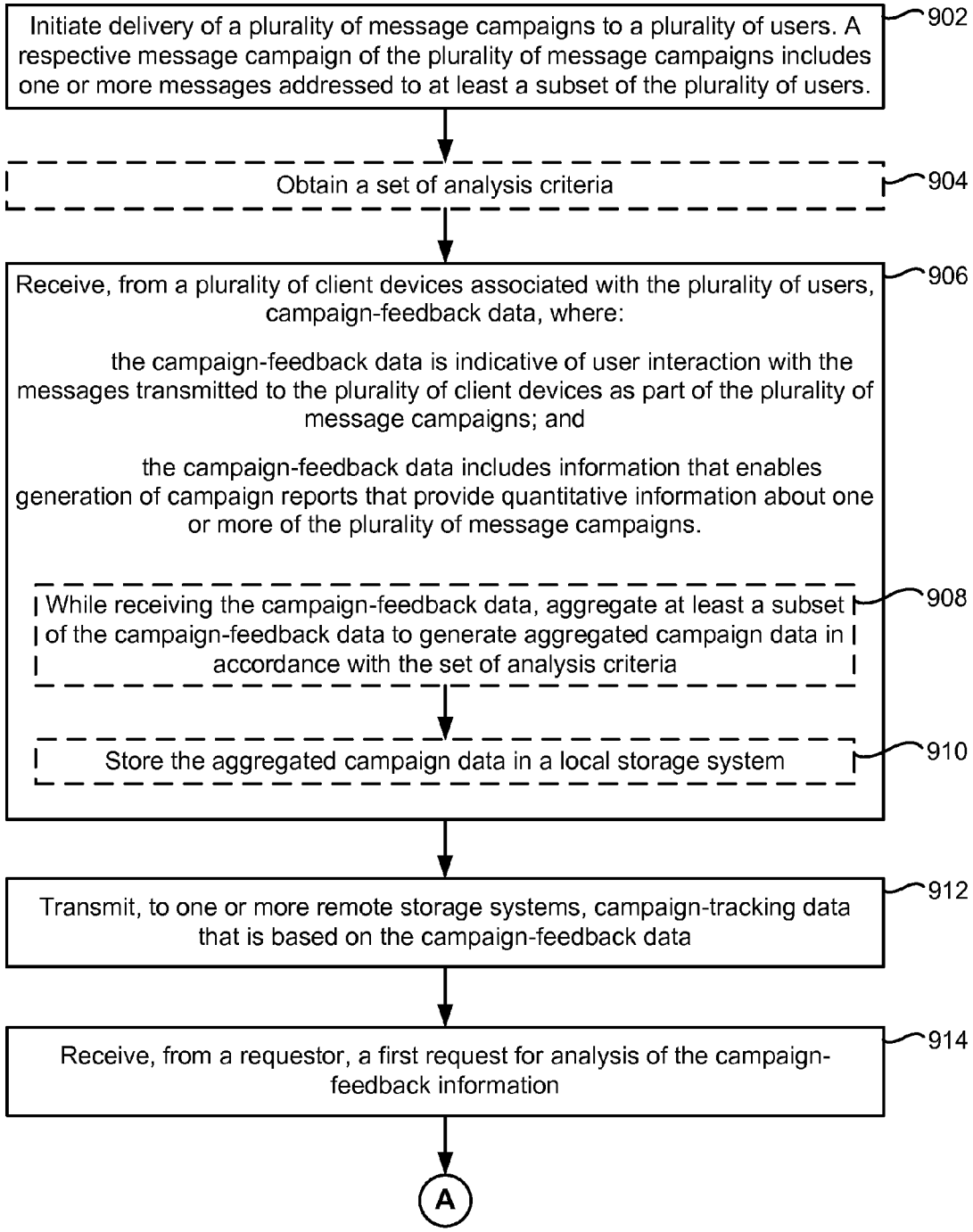
FIGS. 9A-9B include a flow chart illustrating a method for analyzing message campaign feedback data that is stored in a remote storage system, in accordance with some embodiments.
Figure 9B:
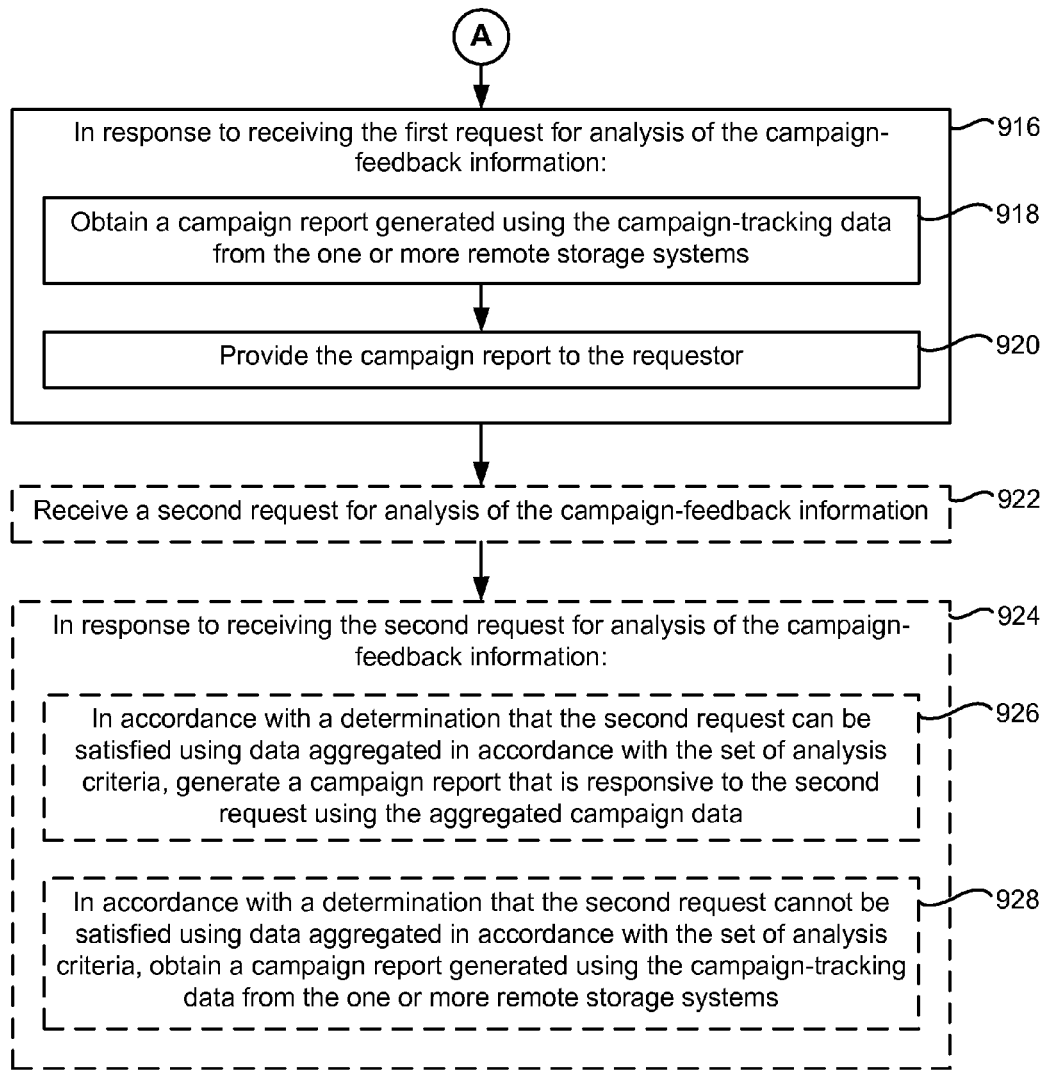

FIGS. 9A and 9B includes a flowchart representing a method 900 for analyzing message campaign feedback data that is stored in a remote storage system, according to certain embodiments. In particular, method 900 describes in greater detail operations performed at a server system (e.g., Data-Collection Server System 106-1 as shown in FIG. 1), as discussed above in FIG. 6. Method 900 is, optionally, governed by instructions that are stored in a non-transitory computer readable storage medium and that are executed by one or more processors of one or more servers (e.g., Data-Collection Server System 106, FIG. 3). Each of the operations shown in method 900 optionally corresponds to instructions stored in a computer memory or computer readable storage medium (e.g., memory 306 of Server 106 in FIG. 3). The computer readable storage medium optionally includes a magnetic or optical disk storage device, solid state storage devices such as Flash memory, or other non-volatile memory device or devices. The computer readable instructions stored on the computer readable storage medium optionally include one or more of: source code, assembly language code, object code, or other instruction format that is interpreted by one or more processors. Some operations in method 900 are, optionally, combined and/or the order of some operations are, optionally, changed.

In some embodiments, a server system (e.g., Data-Collection Server System 106) initiates (902) delivery of a plurality of message campaigns to a plurality of users, (e.g., customers) where a respective message campaign of the plurality of message campaigns includes one or more messages addressed to at least a subset of the plurality of users. In some embodiments, the respective message campaign includes messages sent using a plurality of different message types (e.g., messages sent as part of the respective message campaign include two or more of SMS messages, emails, social networking messages, etc.).

In some embodiments, the server system obtains (904) a set of analysis criteria. In some embodiments, the server system receives (906), from a plurality of client devices (e.g., Client Systems 102) associated with the plurality of users, campaign-feedback data (e.g., receiving feedback regarding interaction 616, as shown in FIG. 6). The campaign-feedback data is indicative of user interaction with the messages transmitted to the plurality of client devices as part of the plurality of message campaigns and the campaign-feedback data includes information that enables generation of campaign reports that provide quantitative information about one or more of the plurality of message campaigns. In some embodiments, while receiving the campaign-feedback data, the server system aggregates (908) at least a subset of the campaign-feedback data to generate aggregated campaign data in accordance with the set of analysis criteria (e.g., aggregating the campaign-feedback data so as to enable the list of queries to be performed using the aggregated campaign data). In some embodiments, the server system stores (910) the aggregated campaign data in a local storage system (e.g., storing feedback data locally 618, as shown in FIG. 6). For example, if the server system has information indicating that a campaign organizer wants to review the effectiveness of a message campaign broken down by age and geographic location of the recipient, then the server system would aggregate the campaign-feedback data so that user engagement with the message campaign between users of different ages and in different geographic locations can be compared by the campaign organizer using the locally stored aggregated campaign data.

In some embodiments, after receiving the campaign-feedback data, the server system transmits (912), to one or more remote storage systems, campaign-tracking data that is based on the campaign-feedback data. In some embodiments, the campaign-tracking data includes fine grained information that enables analysis of the campaign-tracking data based on arbitrary analysis criteria. In some embodiments, the server system stores recent campaign-tracking data that is from before a respective date in a local storage system. The recent campaign-tracking data stored at the local storage system enables the server system to execute queries that have a date range that does not extend beyond the respective date using data in the local storage system without retrieving data from the remote storage system. In some embodiments, the server system stores raw campaign-tracking data for a limited period of time such as for 7, 14, 28, 45 days, until the amount of campaign-tracking data stored in the local storage system exceeds an amount of storage that is allotted in the local storage system for storing campaign-tracking data. In some embodiments pre-aggregated campaign-tracking data is stored for a longer period of time, but this pre-aggregated campaign-tracking data is not configured to be used for responding to arbitrary queries. The campaign-tracking data transmitted to the remote storage system includes at least a portion of the recent campaign-tracking data and enables the server system to execute queries that have a date range that extends beyond the respective date. In some embodiments, the remote storage system has campaign-tracking data that is from both before and after than the respective date and thus the campaign-tracking data at the remote storage system can be used to execute queries that have a date range that extends before and after the respective date. Storing pre-aggregated data in local storage while storing raw data in a remote storage system is advantageous in many situations, because it enables the server system to be respond quickly to a set of frequently used queries that can be executed using the pre-aggregated data while maintaining the flexibility of the fine grained data stored at the remote storage system, which can be used to run queries that cannot be run on the aggregated data.

In some embodiments, after transmitting the campaign-tracking data to the one or more remote storage systems, the server system receives (914), from a requestor, (e.g., a user of Organizer System 103) a first request for analysis of the campaign-feedback information. In some embodiments, the first request for analysis of the campaign-feedback information includes analysis criteria that were not available to the server system at the time that the campaign-tracking data was stored in the remote storage system. For example, users of the server system had not determined which queries would be run against the campaign-tracking data and thus very fine grained data is stored so that the ability to run custom queries on the campaign-tracking data is preserved.

In some embodiments, the first request for analysis of the campaign-feedback information analytics includes a request to generate a pivot table with one or more user-selected metrics (e.g., events to be counted) and one or more user-selected dimensions (e.g., ways in which the event counts are divided). In some embodiments, the one or more user-selected metrics include a metric selected from the set consisting of: a number of people targeted by a message campaign, a number of invalid addresses in a message campaign, a number of message delivery failures in a message campaign, a message delivery failure rate in a message campaign, a number of messages opened in a message campaign, a message open rate in a message campaign, a number of messages in which content was clicked on in a message campaign, a message click rate in a message campaign, a number of messages that were converted into sales in a message campaign, a conversion rate at which messages were converted to sales in a message campaign, an amount of revenue generated by a message campaign, an average order value of orders placed in response to a message campaign, a number of unsubscription requests received in response to a message campaign, a unsubscription rate for users who received a message campaign, a number complaints received about a message campaign, and a rate at which complaints were received in a message campaign. In some embodiments, the one or more user-selected dimensions include a dimension selected from the set consisting of: time at which a message campaign was sent, time at which responses to a message campaign were received, message campaign identifier for a message campaign, message campaign version for a message campaign, email domain to which messages in a message campaign were sent, target users to which a message campaign was sent, message content regions in a message of a message campaign, and audience segment of a message campaign.

In some embodiments, in response to receiving the first request for analysis of the campaign-feedback information (916), the server system obtains (918) a campaign report generated using the campaign-tracking data from the one or more remote storage systems (e.g., the server system obtains a report based on analysis of remote data 642 as shown in FIG. 6). In some embodiments, obtaining the campaign report includes retrieving at least a subset of the campaign-tracking data from the remote storage system and generating the campaign report by running one or more queries against the retrieved campaign-tracking data. In some embodiments, obtaining the campaign report includes transmitting one or more queries to the remote storage system and receiving results of the queries from the remote storage system. In some embodiments, after the message-interaction report has been obtained (e.g., generated by the server system or retrieved from a remote storage system) the server system provides (920) the campaign report to the requestor. For example, when a message campaign organizer requests a pivot table showing message open rates for a set of message campaigns divided by the age of the users, the server system provides an organizer system (e.g., Organizer System 103) with information enabling the requested pivot table to be displayed to the message campaign organizer.

In some embodiments, after storing the aggregated campaign data, the server system receives (922) a second request for analysis of the campaign-feedback information (e.g., a request that has a date range outside of raw campaign-feedback data that is stored in the local storage system). In response to receiving the second request for analysis of the campaign-feedback information and in accordance with a determination that the second request can be satisfied using data aggregated in accordance with the set of analysis criteria, the server system generates (926) a campaign report that is responsive to the second request using the aggregated campaign data (e.g., when the second request includes a query from the list of queries that the data was aggregated to accommodate, then the aggregated campaign data can be used to execute the query). In accordance with a determination that the second request cannot be satisfied using data aggregated in accordance with the set of analysis criteria, obtaining a campaign report generated using the campaign-tracking data from the one or more remote storage systems (e.g., when the second request includes a query that is not on the list of queries that the data was aggregated to accommodate, then the aggregated campaign data cannot be used to execute the query and the server system reverts to using the raw data stored on the remote storage system to execute the query). Thus, in some embodiments, locally stored data is used to respond to generate predefined analytics, but remotely stored data is used to generate analytics that are not predefined analytics and cannot be generated using the locally stored data.

In some embodiments, a respective remote storage system (e.g., Remote Storage System 108) of the one or more remote storage systems has a plurality of performance levels and while using the respective remote storage system at a first performance level, the server system determines that a different performance level for the respective remote storage system is needed. For example, the server system determines that improved remote storage system performance is needed and increases the performance level of the respective remote storage system or the server system determines that the current level of remote storage system performance is not needed and that a lower level of performance would be acceptable and more cost-effective and the server system decreases the performance level of the respective remote storage system. In some embodiments, in response to the determination that a different performance level for the respective remote storage system is needed, the server system requests a change in performance level of the respective remote storage system from the first performance level to a second, different performance level. The performance level of the respective remote storage system includes values for one or more of: an amount of storage space available at the respective remote storage system, a speed of read access to the respective remote storage system, a speed of write access to the respective remote storage system, and shared use of storage servers at the remote storage system (e.g., whether the server system has exclusive use of a cluster of storage servers at the remote storage system or whether usage of the cluster of storage servers is shared with one or more third-parties). In some embodiments, the request to change the performance level of the respective remote storage system is sent to the remote storage system. In some embodiments, the request to change the performance level of the remote storage system is sent to a coordinating server (e.g., Coordinating Server System 109) that coordinates service of the remote storage system for multiple data-collection server systems and the request is forwarded from the coordinating server system to the remote storage system.

It should be understood that the particular order in which the operations in FIG. 9 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, 1000, 1100 and/or 1200) are also applicable in an analogous manner to method 900 described above with respect to FIG. 9. For example, the messages, message campaigns, campaign-feedback data, and campaign-tracking data described above with reference to method 900 optionally have one or more of the characteristics of the messages, message campaigns, campaign-feedback data, and campaign-tracking data described herein with reference to other methods described herein (e.g., methods 700, 800, 1000, 1100 and/or 1200). For brevity, these details are not repeated here.

Figure 10:
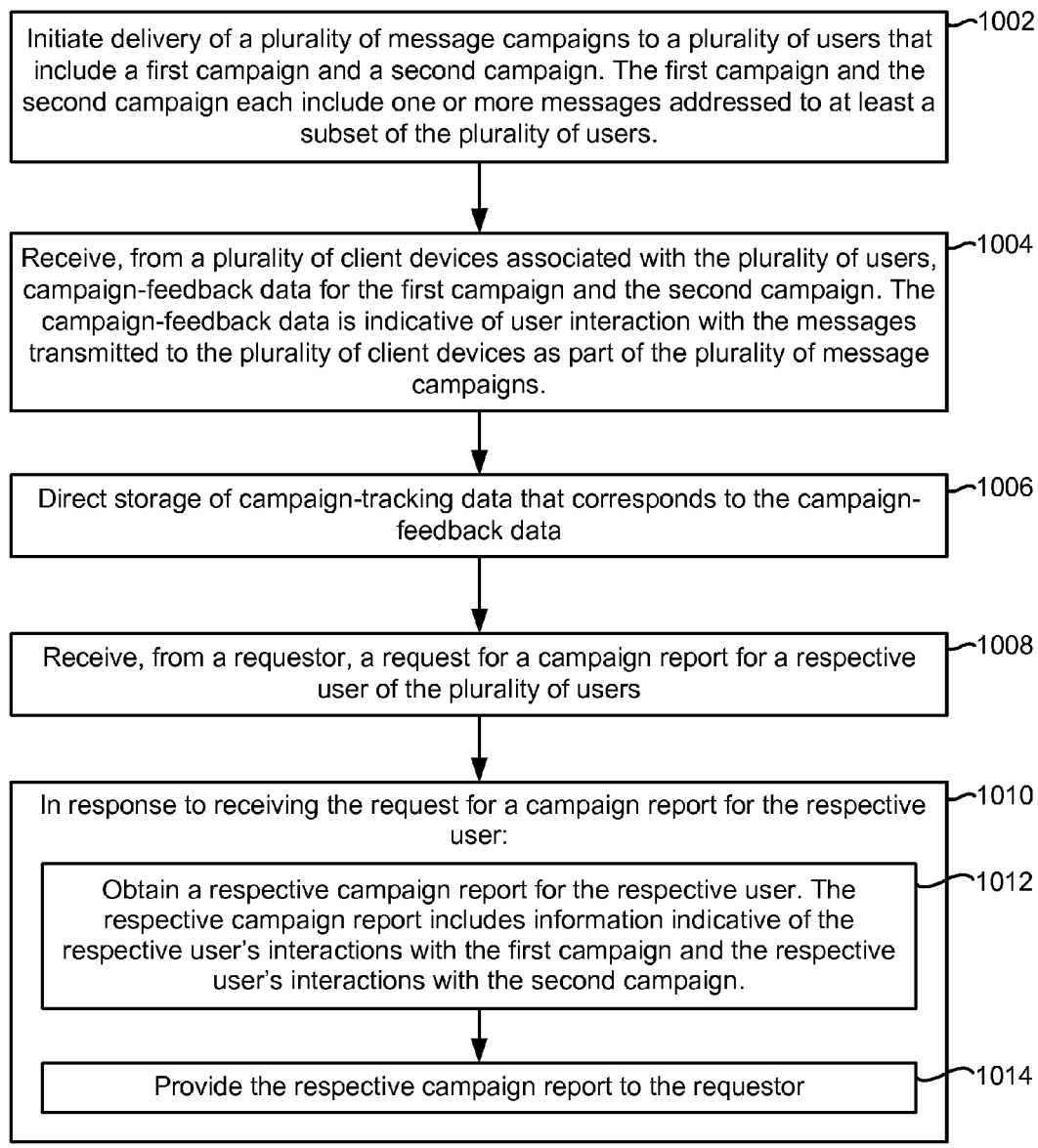
FIG. 10 includes a flow chart illustrating a method for providing information about a user's interaction with multiple message campaigns, in accordance with some embodiments.

FIG. 10 includes a flowchart representing a method 1000 for providing information about a user's interaction with multiple message campaigns, according to certain embodiments. In particular, method 1000 describes in greater detail operations performed at a server system (e.g., Data-Collection Server System 106-1 as shown in FIG. 1), as discussed above in FIG. 6. Method 1000 is, optionally, governed by instructions that are stored in a non-transitory computer readable storage medium and that are executed by one or more processors of one or more servers (e.g., Data-Collection Server System 106, FIG. 3). Each of the operations shown in FIG. 10 optionally corresponds to instructions stored in a computer memory or computer readable storage medium (e.g., memory 306 of Server 106 in FIG. 3). The computer readable storage medium optionally includes a magnetic or optical disk storage device, solid state storage devices such as Flash memory, or other non-volatile memory device or devices. The computer readable instructions stored on the computer readable storage medium optionally include one or more of: source code, assembly language code, object code, or other instruction format that is interpreted by one or more processors. Some operations in method 1000 are, optionally, combined and/or the order of some operations are, optionally, changed.

In some embodiments, a server system (e.g., Data-Collection Server System 106) initiates (1002) delivery of a plurality of message campaigns to a plurality of users that include a first campaign and a second campaign, (e.g., customers) where the first campaign and the second campaign each include one or more messages addressed to at least a subset of the plurality of users. The server system receives (1004), from a plurality of client devices (e.g., Client Systems 102) associated with the plurality of users, campaign-feedback data (e.g., receiving feedback regarding interaction 616, as shown in FIG. 6) for the first campaign and the second campaign. The campaign-feedback data is indicative of user interaction with the messages transmitted to the plurality of client devices as part of the plurality of message campaigns. In some embodiments, a respective message campaign of the plurality of message campaigns includes messages sent using a plurality of different message types (e.g., messages sent as part of the respective message campaign include two or more of SMS messages, emails, social networking messages, etc.).

In some embodiments, after receiving the campaign-feedback data, the server system directs (1006) storage of campaign-tracking data that corresponds to the campaign-feedback data (e.g., storing the campaign-tracking data at the server system and/or transmitting the campaign-tracking data to one or more remote storage systems such as Remote Storage System 108). After directing storage of the campaign-tracking data, the server system receives (1008), from a requestor (e.g., a message campaign organizer using Organizer System 103), a request for a campaign report for a respective user of the plurality of users (e.g., request analytics 628, as shown in FIG. 6).

In some embodiments, in response to receiving the request for a campaign report for the respective user (1010), the server system obtains (1012) a respective campaign report (e.g., the server system obtains a report based on analysis of remote data 642 as shown in FIG. 6) for the respective user, where the respective campaign report includes information indicative of the respective user's interactions with the first campaign and the respective user's interactions with the second campaign (e.g., the respective user's interactions with the first campaign and the second campaign are isolated from interactions by other users in the campaign report). Thus, in some embodiments, a campaign report is generated for a single user or a campaign report is generated for multiple users, but breaks information about the users' interactions with message campaigns so that the interactions of individual users with the message campaigns can be determined.

In some embodiments, the campaign report for the respective user includes information identifying the plurality of message campaigns that were sent to the respective user. In some embodiments, the campaign report for the respective user includes information identifying a level of user engagement with the plurality of message campaigns that were sent to the respective user (e.g., a message open rate for a plurality of message campaigns sent to the user). In some embodiments, the campaign report for the respective user includes information identifying one or more actions taken by the user in response to receiving one or more of the plurality of message campaigns (e.g., for each of a plurality of message campaign messages, providing an indication of whether a user opened the message, selected a hyperlink in the message, and/or purchased any goods or services described in the message). In some embodiments, the campaign report includes a first record for the first message campaign that occurred at a first time and a second record for the second message campaign that occurred at a second time, the first record enables access to information about a first version of a user profile of the respective user at the first time, and the second record enables access to information about a second version of the user profile of the respective user at the second time that is different from the first version of the user profile. For example if the user had a "gold" reward status when the first message campaign was received and had a "sliver" reward status when the second message campaign was received, the campaign report for the user would indicate the reward status as well as the user's interaction with the different message campaigns.

In some embodiments, the campaign report includes information for the plurality of users and the information is separated out by user to indicate the interactions of individual users with the first campaign and the second campaign. In some embodiments, the campaign report includes information indicating aggregate behavior of the respective user over the plurality of message campaigns. For example, the campaign report indicates a level of engagement of the user across a plurality of campaigns, or indicates a rate at which messages to the user are converted into sales or other beneficial activity for the campaign organizer across a plurality of campaigns. In some embodiments, the campaign report includes one or more controls for selecting which message campaigns are included in the report. For example, the campaign report enables a user reviewing the campaign report to change a date range of the report so that only message campaigns that occurred during the date range are included in the report or enables the user reviewing the campaign report to select message campaigns to include in the report based on other user-defined criteria. Viewing a report that shows the response of a particular user to message campaigns, can provide valuable information about the user and how best to tailor message campaigns to engage the user's interest.

In some embodiments, the respective user is a member of a group of users (e.g., an group of users who have registered as members of the group or an implicit group of users who meet predefined demographic criteria such as age, sex, income level, geographic location, etc.) and the campaign report for the respective user includes a comparison between the respective user's interactions with the first campaign (and the respective user's interactions with the second campaign) and interactions of the group of users with the first campaign. In some embodiments, after the message-interaction report has been obtained (e.g., generated by the server system or retrieved from a remote storage system) the server system provides (1014) the respective campaign report to the requestor. Comparing the interactions of a particular user with message campaigns as compared to the group of similar users can provide valuable information for better tailoring future message campaigns to the user as well as to other users in the group. While the examples described above refer to a campaign report that includes information about a first message campaign and a second message campaign for a respective user, it should be understood that the information in the campaign report optionally includes information about the respective user's interactions with any number of message campaigns. Optionally the campaign report includes statistics and activity detail for the respective user over the respective user's entire history with the company/brand whose products/services are being promoted by the message campaigns (or some subset of that history such as a time-limited subset of that history).

It should be understood that the particular order in which the operations in FIG. 10 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, 900, 1100 and/or 1200) are also applicable in an analogous manner to method 1000 described above with respect to FIG. 10. For example, the messages, message campaigns, campaign-feedback data, and campaign-tracking data described above with reference to method 1000 optionally have one or more of the characteristics of the messages, message campaigns, campaign-feedback data, and campaign-tracking data described herein with reference to other methods described herein (e.g., methods 700, 800, 900, 1100 and/or 1200). For brevity, these details are not repeated here.

Figure 11:
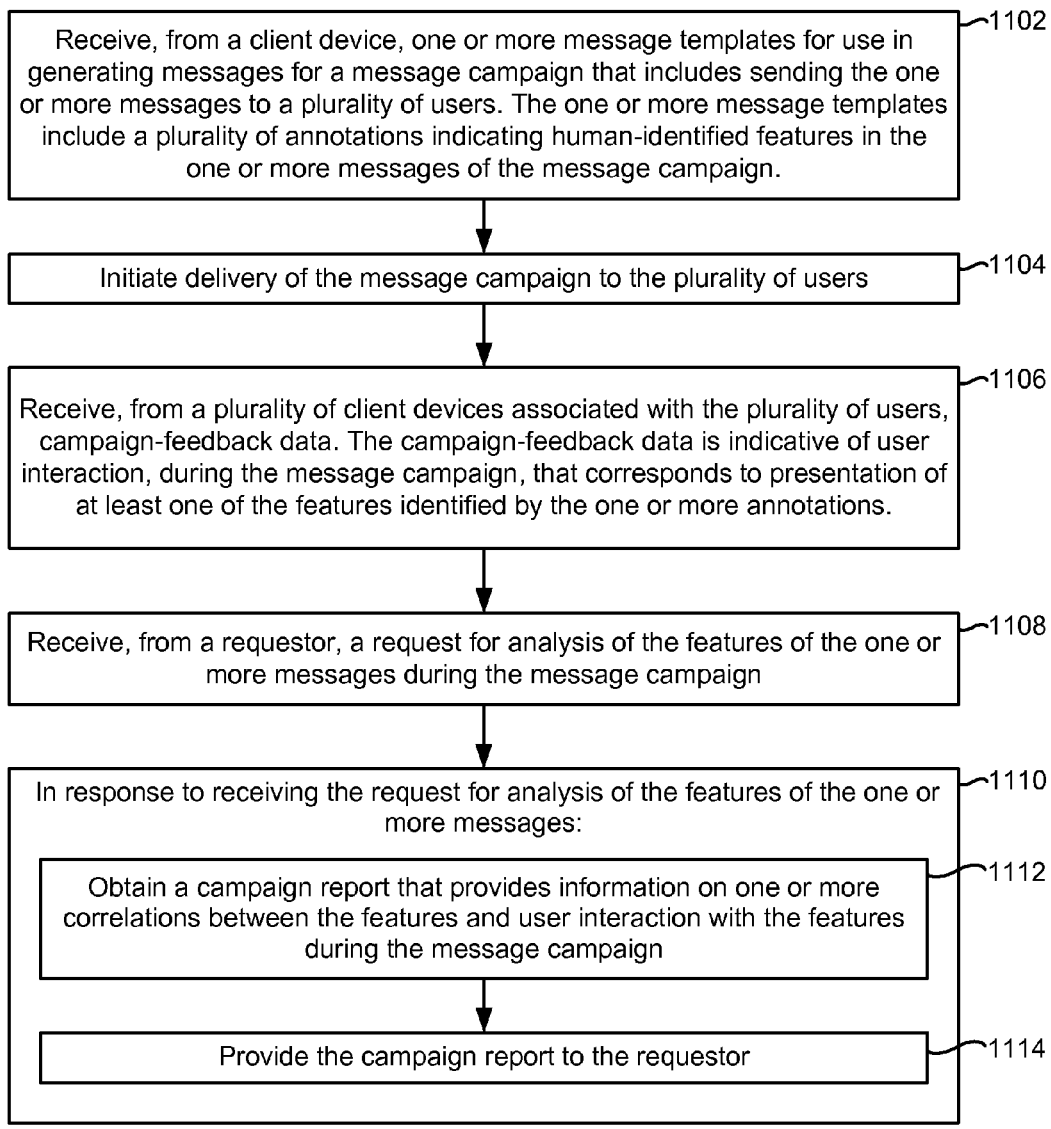
FIG. 11 includes a flow chart illustrating a method for determining a correlation between human-identified features and user interaction with messages in a message campaign, in accordance with some embodiments.

FIG. 11 includes a flowchart representing a method 1100 for determining a correlation between human-identified features and user interaction with messages in a message campaign, according to certain embodiments. In particular, method 1100 describes in greater detail operations at a server system (e.g., Data-Collection Server System 106-1 as shown in FIG. 1), as discussed above in FIG. 6. Method 1000 is, optionally, governed by instructions that are stored in a non-transitory computer readable storage medium and that are executed by one or more processors of one or more servers (e.g., Data-Collection Server System 106, FIG. 3). Each of the operations shown in FIG. 11 optionally corresponds to instructions stored in a computer memory or computer readable storage medium (e.g., memory 306 of Server 106 in FIG. 3). The computer readable storage medium optionally includes a magnetic or optical disk storage device, solid state storage devices such as Flash memory, or other non-volatile memory device or devices. The computer readable instructions stored on the computer readable storage medium optionally include one or more of: source code, assembly language code, object code, or other instruction format that is interpreted by one or more processors. Some operations in method 1100 are, optionally, combined and/or the order of some operations are, optionally, changed.

In some embodiments, a server system (e.g., Data-Collection Server System 106) receives (1102), from a client device (e.g., Organizer System 103), one or more message templates for use in generating messages for a message campaign that includes sending the one or more messages to a plurality of users, where the one or more message templates include a plurality of annotations indicating human-identified features in the one or more messages of the message campaign (e.g., features such as sections of content and/or images that were identified by a human marketer to aid in determining the effectiveness of the message campaign). In some embodiments, the message campaign includes messages sent using a plurality of different message types (e.g., messages sent as part of the message campaign include two or more of SMS messages, emails, social networking messages, etc.).

In some embodiments, a respective message of the message campaign is generated by populating a message template of the one or more message templates with content that is customized for a recipient of the respective message. For example, a message template includes a plurality of defined regions with associated annotations, as shown in FIG. 13 where a region is defined by start tag ##SV_BEGIN_REGION## and an end tag ##SV_END_REGION##, and the server system inserts content into the defined regions. In some embodiments, generating a message for a message campaign includes inserting a name of the recipient and/or selecting content that is likely to be of particular interest to the recipient into an email that is customized for the recipient of the message.

In some embodiments, the plurality of annotations are incorporated into the content of the one or more messages. In some embodiments, a respective annotation of the plurality of annotations includes a start tag and an end tag in a respective message, content of the respective message is in between the start tag and the end tag, and the content of the respective message that is between the start tag and the end tag is associated with the annotation. In some embodiments, the annotations are configured so that the content that is associated with annotations does not overlap (e.g., each portion of content of the respective message is associated with at most a single annotation). In some embodiments, multiple annotations are associated with a same portion of content (e.g., to indicate that the content has a "happy" sentiment and that the content is a "value-oriented" advertisement). In some embodiments, the server system, prior to initiating delivery of the message campaign to the plurality of users, removes the plurality of annotations from the one or more messages. In some embodiments, the annotations reflect the judgment of a human user (e.g., the annotations for a respective message are machine-interpretable information that indicates a marketer's interpretation of the content of the respective message). For example, a message campaign organizer reviews a draft message for a message campaign, or a message template for use in generating messages in an advertising campaign and define regions of the draft message or message template based on the campaign organizer's subjective judgment as to the nature of different portions of the draft message or message template (e.g., whether an image conveys a "happy" sentiment, a "sad" sentiment, a "high energy" sentiment, or a "relaxed" sentiment, or whether an offer for goods or services conveys a "low cost" message or a "high value" message).

In some embodiments, the server system initiates (1104) delivery of the message campaign to the plurality of users (e.g., initiate message campaign 610, as shown in FIG. 6). In some embodiments, the messages in the message campaign include the annotations. In some embodiments, the messages in the message campaign do not include the annotations but include the human-identified features that are associated with the annotations via annotation correlation data generated by the server system. In some embodiments, when a respective message is sent out as part of a messaging campaign, annotation information identifying features of the messages as being associated with different annotations is stored by the server system for later use in associating features with which a user has interacted with corresponding annotations.

In some embodiments, receives (1106), from a plurality of client devices associated with the plurality of users, campaign-feedback data. The campaign-feedback data is indicative of user interaction, during the message campaign, that corresponds to presentation of at least one of the features identified by the one or more annotations (e.g., receive feedback regarding interaction 616, as shown in FIG. 6). For example, when the server system receives information indicating that a user has selected a hyperlink in a message, the server system determines which feature of the message included the hyperlink and which annotation corresponds to the feature of the message that included the hyperlink and associates the selection of the hyperlink with the annotation (e.g., user X selected a hyperlink associated with a feature with a "happy" sentiment). After associating the selection of the hyperlink with the annotation, the server system stores or directs storage of feedback data that indicates that the user interacted with the feature identified by the annotation. Similar operations are performed for other interactions with messages in the message campaign by other users, and the server system also stores or directs storage of campaign-feedback data that corresponds to these interactions to enable generation of campaign reports that correlate the human-identified features and interactions with the features by recipients of the message campaigns.

In some embodiments, after receiving the campaign-feedback data, the server system receives (1108), from a requestor, a request for analysis of the features of the one or more messages during the message campaign. In some embodiments, in response (1110) to receiving the request for analysis of the features of the one or more messages, the server system obtains (1112) a campaign report that provides information on one or more correlations between the features and user interaction with the features during the message campaign. In some embodiments, obtaining the campaign report includes retrieving data from a remote storage system and generating the campaign report by running one or more queries against the retrieved data. In some embodiments, obtaining the campaign report includes transmitting one or more queries to a remote storage system and receiving results of the queries from the remote storage system (e.g., the server system obtains a report based on analysis 642 of remote data as shown in FIG. 6). In some embodiments, the campaign report indicates which type of feature users are more likely to interact with (e.g., determining that a feature with a "happy" image is more likely to be selected by users than a similar feature with a "sad" image).

In some embodiments, during the message campaign a respective message in the one or more messages with a plurality of features is sent to a set of users, the campaign-feedback data includes an indication of interactions by users in the set of users with the features in the respective message, and the campaign report provides information comparing user engagement between different features in the respective message (e.g., the campaign report compares the effectiveness of advertisements identified as value-oriented advertising by the annotations as compared with advertisements identified as quality-oriented advertising by the annotations in the respective message of the message campaign). For example, the campaign report includes information indicating whether 18-25 year old males are more likely to interact with an advertisement for a respective product if is advertised as being a good value or if it is advertised as being a premium product. This information can be provided to campaign organizers for use in selecting whether to advertise similar products to 18-25 year old males using value-oriented advertising (e.g., if 18-25 year old males are shown to interact more with the respective product advertised as a good value), or quality-oriented advertising (e.g., if 18-25 year old males are shown to interact more with the respective product advertised as a premium product).

In some embodiments, during the message campaign a first message with a plurality of features in a first arrangement is sent to a first set of users and a second message with the plurality of features in a second arrangement is sent to a second set of users. In some embodiments, the campaign-feedback data includes an indication of interactions by users in the first set of users with a respective feature in the first arrangement and an indication of the interaction by users in the second set of users with the respective feature in the second arrangement. In some embodiments, the campaign report provides information comparing user engagement between the respective feature in the first arrangement and the respective feature in the second arrangement (e.g., the campaign report compares the effectiveness of the respective feature when it is displayed at a top of an email as compared with when it is displayed in a side bar of an email). For example, the campaign report includes information indicating whether a "happy" image at a top of a message increases the effectiveness of a message more or less than a "happy" image in a side bar of the message.

In some embodiments, during the message campaign a first message with a plurality of features in a first arrangement is sent to a first set of users and a second message with the plurality of features in a second arrangement is sent to a second set of users. In some embodiments, the campaign-feedback data includes an indication of interactions by users in the first set of users with a first feature in a respective location in the first arrangement and an indication of the interaction by users in the second set of users with a second feature in the respective location in the second arrangement. In some embodiments, and the campaign report provides information comparing user engagement between the first feature in the respective location and the second feature in the respective location (e.g., the campaign report compares whether a first advertisement or a second advertisement is more effective at a top of an email). For example, for a respective marketing campaign that could use either messages of format A or messages of format B, an initial test batch of messages is sent out. The initial test batch of messages includes sending messages with format A to 5% of the target users and sending messages with format B to 5% of the target users. After receiving campaign-feedback data from the initial test batch of messages, the server system determines whether messages with format A or format B are more effective, selects the more effective format and sends the rest of the messages in message campaign using the selected format. In some embodiments, after the message-interaction report has been obtained (e.g., generated by the server system or retrieved from a remote storage system) the server system provides (1114) the campaign report to the requestor. For example the campaign report is transmitted from the server system to an organizer system (e.g., Organizer System 103) that is associated with an organizer of one or more message campaigns.

It should be understood that the particular order in which the operations in FIG. 11 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, 900, 1000, and/or 1200) are also applicable in an analogous manner to method 1100 described above with respect to FIG. 11. For example, the messages, message campaigns, campaign-feedback data, and campaign-tracking data described above with reference to method 1100 optionally have one or more of the characteristics of the messages, message campaigns, campaign-feedback data, and campaign-tracking data described herein with reference to other methods described herein (e.g., methods 700, 800, 900, 1000, and/or 1200). For brevity, these details are not repeated here.

Figure 12:
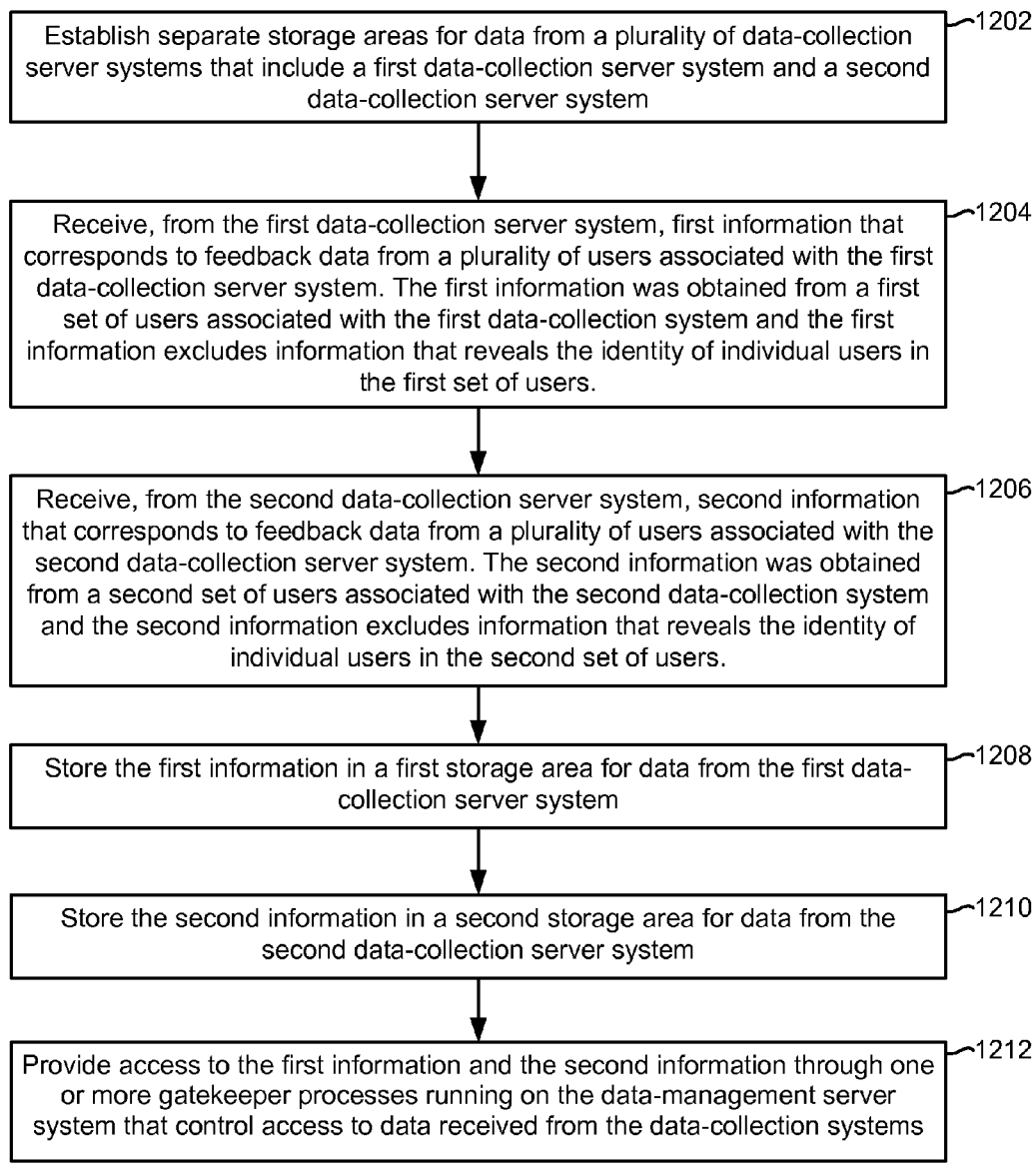
FIG. 12 includes a flow chart illustrating a method for controlling access to feedback data from multiple different data-collection server systems, in accordance with some embodiments.

FIG. 12 includes a flowchart representing a method 1200 for controlling access to feedback data from multiple different data-collection server systems, according to certain embodiments. In particular, method 1200 describes in greater detail operations performed at a server system (e.g., Remote Storage System 108 as shown in FIG. 1), as discussed above in FIG. 6. Method 1200 is, optionally, governed by instructions that are stored in a non-transitory computer readable storage medium and that are executed by one or more processors of one or more servers (e.g., Remote Storage System 108, FIG. 4). Each of the operations shown in FIG. 12 optionally corresponds to instructions stored in a computer memory or computer readable storage medium (e.g., memory 406 of Server 108 in FIG. 4). The computer readable storage medium optionally includes a magnetic or optical disk storage device, solid state storage devices such as Flash memory, or other non-volatile memory device or devices. The computer readable instructions stored on the computer readable storage medium optionally include one or more of: source code, assembly language code, object code, or other instruction format that is interpreted by one or more processors. Some operations in method 1200 are, optionally, combined and/or the order of some operations are, optionally, changed.

In some embodiments, a data-management server system (e.g., Remote Storage System 108) establishes (1202) separate (e.g., physically separate or logically separate) storage areas for data from a plurality of data-collection server systems (e.g., Data-Collection Server Systems 106) that include a first data-collection server system and a second data-collection server system (e.g., server systems that are operated by companies that send marketing messages to their customers). In some embodiments, the separate storage areas are at the data-management server system. In some embodiments, the separate storage areas are at a remote storage system. In some embodiments, the first data-collection server system collects campaign-feedback data related to interaction of recipients of a first set of one or more message campaigns with messages of the first set of one or more message campaigns and the second data-collection server system collects campaign-feedback data related to interaction of recipients of a second set of one or more message campaigns with messages of the second set of one or more message campaigns. In some embodiments, the first storage area and the second storage area are not directly accessible by the first data-collection server system and the second data-collection server system (e.g., the data-collection server systems are not granted read/write access to at least some of the data stored at the remote storage system, such as the data stored in Permanent Storage 144).

In some embodiments, the data-management server system receives (1204), from the first data-collection server system, first information that corresponds to feedback data from a plurality of users associated with the first data-collection server system. In some circumstances, the first information was obtained from a first set of users associated with the first data-collection system and the first information excludes information that reveals the identity of individual users in the first set of users. In some embodiments, the feedback data is associated with sensitive information at the first data-collection server system but that sensitive information is not transmitted to the data-management server system (e.g., the campaign-tracking information is anonymized by removing any personally identifiable information such as real name, social security number, credit card number, home address, etc.).

In some embodiments, the data-management server system receives (1206), from the second data-collection server system, second information that corresponds to feedback data from a plurality of users associated with the second data-collection server system. In some circumstances, the second information was obtained from a second set of users associated with the second data-collection system and the second information excludes information that reveals the identity of individual users in the second set of users. In some embodiments, the feedback data is associated with sensitive information at the second data-collection server system but that sensitive information is not transmitted to the data-management server system (e.g., the campaign-tracking information is anonymized by removing any personally identifiable information such as real name, social security number, credit card number, home address, etc.).

The data-management server system then stores (1208) the first information in a first storage area for data from the first data-collection server system (e.g., a portion of Permanent Storage 144 that is reserved for data from the first data-collection server system). In some embodiments, the first information is stored as a flat file in the first storage area. The data-management server system also stores (1210) the second information in a second storage area for data from the second data-collection server system (e.g., a portion of Permanent Storage 144 that is reserved for data from the second data-collection server system). In some embodiments, the first storage area and the second storage area are not directly accessible by the first data-collection server system and the second data-collection server system (e.g., the data-collection server systems are not granted read/write access to data stored in Permanent Storage 144 at the remote storage system). In some embodiments, the first storage area and the second storage area are controlled by the data-management server system. In some embodiments, prior to storing the first information in the first storage area and storing the second information in the second storage area, the data-management server system stores the first information and the second information in a common storage area (e.g., Staging Area 142). Enabling data-collection server systems to read/write from Staging Area 142 improves the performance of Remote Storage System 108, because Remote Storage System 108 does not need to filter incoming data. In some embodiments, data is later moved to Permanent Storage 144, to which Data-Collection Server Systems 106 do not have direct access, and thus the data in Permanent Storage 144 is protected from being inadvertently accessed by a Data-Collection Server System 106 that should not have access to the data. Moreover, removing sensitive information from the data that is provided to Remote Storage System 108 is advantageous, because it ensures that even if the security of Remote Storage System 108 is compromised, the sensitive information is not also compromised.

In some embodiments, the data-management server system provides (1212) access to the first information and the second information through one or more gatekeeper processes running on the data-management server system that control access to data received from the data-collection systems. In some embodiments, providing access to the first information and the second information includes receiving a request for respective information. In some embodiments, in response to the request the data-management server system determines whether the request is an aggregate data request or a targeted data request. In accordance with a determination that the request is a targeted data request, the data-management server system uses a first gatekeeper process (e.g., Target Data Retrieval Module 422) to locate the respective information, where the first gatekeeper process is configured to retrieve targeted data using one or more database queries. In accordance with a determination that the request is an aggregate data request, the data-management server system uses a second gatekeeper process (e.g., Aggregate Data Retrieval Module 424) that is different from the first gatekeeper process to locate and aggregate the respective information, where the second gatekeeper process is configured to retrieve and aggregate data using one or more database queries (e.g., the data-management server system uses a first gatekeeper processes for retrieving specific information such as data for a particular user and uses a second gatekeeper process for retrieving aggregated information for use in analyzing the feedback data). Using different gatekeeper processes for retrieving different types of information enables the different gatekeeper processes to be optimized for the types of tasks that they are likely to be asked to perform.

It should be understood that the particular order in which the operations in FIG. 12 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, 900, 1000, and/or 1100) are also applicable in an analogous manner to method 1200 described above with respect to FIG. 12. For example, the messages, message campaigns, campaign-feedback data, and campaign-tracking data described above with reference to method 1200 optionally have one or more of the characteristics of the messages, message campaigns, campaign-feedback data, and campaign-tracking data described herein with reference to other methods described herein (e.g., methods 700, 800, 900, 1000, and/or 1100). For brevity, these details are not repeated here.

Attention is now directed to FIG. 13, which includes an example of inserting annotations into HTML code to mark human-identified features in messages in a message campaign. In FIG. 13, HTML code for a template message for generating messages for a message campaign is shown. The HTML code describes multiple tables for the template email, defining, for the tables: a table class, width, border width, cell spacing, cell padding and background color. Inserted in the HTML code for table that includes one or more annotated features are annotations that define the extent of a region that includes the annotated features. In this example, a start tag "##SV_BEGIN_REGION[Slot1][~offer1]##" indicates a beginning of the region and an end tag "##SV_END_REGION##" indicates the end of the region. In the example shown in FIG. 13, content inserted into the one or more tables that are defined between the start tag and the end tag is annotated as being in a region corresponding to slot 1, offer 1. The information about the annotations associated with different features is maintained (e.g., in the messages sent as part of the message campaign or stored at the server system) so that user interactions with the features can be associated with the annotations when analyzing user interactions with the features (e.g., when obtaining a campaign report that provides information on one or more correlations between the features and user interaction with the features during the message campaign).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
at a data-management server system comprising one or more processors and memory:
establishing separate storage areas for data from a plurality of data-collection server systems that include a first data-collection server system and a second data-collection server system;
receiving, from the first data-collection server system, first information that corresponds to feedback data from a plurality of users associated with the first data-collection server system, wherein the first information was obtained from a first set of users associated with the first data-collection system and the first information excludes information that reveals the identity of individual users in the first set of users;
receiving, from the second data-collection server system, second information that corresponds to feedback data from a plurality of users associated with the second data-collection server system, wherein the second information was obtained from a second set of users associated with the second data-collection system and the second information excludes information that reveals the identity of individual users in the second set of users;
storing the first information in a first storage area for data from the first data-collection server system;
storing the second information in a second storage area for data from the second data-collection server system; and
providing access to the first information and the second information through a plurality of gatekeeper processes running on the data-management server system that control access to data received from the data-collection systems,
wherein providing access to the first information and the second information includes:
receiving a request for respective information; and
in response to the request:
in accordance with a determination that the request is a targeted data request, using a first gatekeeper process of the plurality of gatekeeper processes to locate the respective information, wherein the first gatekeeper process is configured to retrieve targeted data in an optimized manner, as compared to other ones of the plurality of gatekeeper processes, using one or more database queries; and
in accordance with a determination that the request is an aggregate data request, using a second gatekeeper process of the plurality of gatekeeper processes, that is different from the first gatekeeper process, to locate and aggregate the respective information, wherein the second gatekeeper process is configured to retrieve and aggregate data in an optimized manner, as compared to other ones of the plurality of gatekeeper processes, using one or more database queries.

2. The method of claim 1, wherein the first storage area and the second storage area are not directly accessible by the first data-collection server system and the second data-collection server system.

3. The method of claim 1, wherein the first storage area and the second storage area are controlled by the data-management server system.

4. The method of claim 1, comprising, prior to storing the first information in the first storage area and storing the second information in the second storage area, storing the first information and the second information in a common storage area.

5. The method of claim 4, wherein the first information is stored as a flat file in the first storage area.

6. The method of claim 1, wherein:
the first data-collection server system collects first campaign-feedback data related to interaction of recipients of a first set of one or more message campaigns with messages of the first set of one or more message campaigns and provides the first information, corresponding to the first campaign-feedback data, to the data-management server system; and the second data-collection server system collects second campaign-feedback data related to interaction of recipients of a second set of one or more message campaigns with messages of the second set of one or more message campaigns and provides the second information, corresponding to the second campaign-feedback data, to the data-management server system, wherein the second set of one or more message campaigns are distinct from the first set of one or more message campaigns.

7. The method of claim 6, wherein:

each of the first data-collection server system and second data-collection server system cause a respective plurality of message campaigns to be delivered to a respective plurality of client devices associated with a plurality of users, wherein a respective message campaign of the plurality of message campaigns includes one or more messages addressed to at least a subset of the respective plurality of users.

8. A data-management server system, comprising:

one or more processors;

memory; and one or more programs, wherein the one or more programs are stored in the memory and configured to be executed by the one or more processors, the one or more programs including instructions for:

establishing separate storage areas for data from a plurality of data-collection server systems that include a first data-collection server system and a second data-collection server system;

receiving, from the first data-collection server system, first information that corresponds to feedback data from a plurality of users associated with the first data-collection server system, wherein the first information was obtained from a first set of users associated with the first data-collection system and the first information excludes information that reveals the identity of individual users in the first set of users;

receiving, from the second data-collection server system, second information that corresponds to feedback data from a plurality of users associated with the second data-collection server system, wherein the second information was obtained from a second set of users associated with the second data-collection system and the second information excludes information that reveals the identity of individual users in the second set of users;

storing the first information in a first storage area for data from the first data-collection server system;

storing the second information in a second storage area for data from the second data-collection server system; and providing access to the first information and the second information through a plurality of gatekeeper processes running on the data-management server system that control access to data received from the data-collection systems, wherein providing access to the first information and the second information includes:

receiving a request for respective information; and in response to the request:

in accordance with a determination that the request is a targeted data request, using a first gatekeeper process of the plurality of gatekeeper processes to locate the respective information, wherein the first gatekeeper process is configured to retrieve targeted data in an optimized manner, as compared to other ones of the plurality of gatekeeper processes, using one or more database queries; and in accordance with a determination that the request is an aggregate data request using a second gatekeeper process of the plurality of gatekeeper processes, that is different from the first gatekeeper process, to locate and aggregate the respective information, wherein the second gatekeeper process is configured to retrieve and aggregate data in an optimized manner, as compared to other ones of the plurality of gatekeeper processes, using one or more database queries.

9. The data-management server system of claim 8, wherein the first storage area and the second storage area are not directly accessible by the first data-collection server system and the second data-collection server system.

10. The data-management server system of claim 8, wherein the first storage area and the second storage area are controlled by the data-management server system.

11. The data-management server system of claim 8, wherein the one or more programs comprise instructions for, prior to storing the first information in the first storage area and storing the second information in the second storage area, storing the first information and the second information in a common storage area.

12. The data-management server system of claim 8, wherein the first information is stored as a flat file in the first storage area.

13. The data-management server of claim 8, wherein:

the first data-collection server system collects first campaign-feedback data related to interaction of recipients of a first set of one or more message campaigns with messages of the first set of one or more message campaigns and provides the first information, corresponding to the first campaign-feedback data, to the data-management server system; and the second data-collection server system collects second campaign-feedback data related to interaction of recipients of a second set of one or more message campaigns with messages of the second set of one or more message campaigns and provides the second information, corresponding to the second campaign-feedback data, to the data-management server system, wherein the second set of one or more message campaigns are distinct from the first set of one or more message campaigns.

14. The data-management server system of claim 13, wherein:

each of the first data-collection server system and second data-collection server system cause a respective plurality of message campaigns to be delivered to a respective plurality of client devices associated with a plurality of users, wherein a respective message campaign of the plurality of message campaigns includes one or more messages addressed to at least a subset of the respective plurality of users.

15. A non-transitory computer readable storage medium, storing one or more programs for execution by a data-management server system, wherein the one or more programs include instructions for:
- establishing separate storage areas for data from a plurality of data-collection server systems that include a first data-collection server system and a second data-collection server system;
- receiving, from the first data-collection server system, first information that corresponds to feedback data from a plurality of users associated with the first data-collection server system, wherein the first information was obtained from a first set of users associated with the first data-collection system and the first information excludes information that reveals the identity of individual users in the first set of users;
- receiving, from the second data-collection server system, second information that corresponds to feedback data from a plurality of users associated with the second data-collection server system, wherein the second information was obtained from a second set of users associated with the second data-collection system and the second information excludes information that reveals the identity of individual users in the second set of users;
- storing the first information in a first storage area for data from the first data-collection server system;
- storing the second information in a second storage area for data from the second data-collection server system; and
- providing access to the first information and the second information through a plurality of gatekeeper processes running on the data-management server system that control access to data received from the data-collection systems,
- wherein providing access to the first information and the second information includes:
- receiving a request for respective information; and
- in response to the request:
  - in accordance with a determination that the request is a targeted data request, using a first gatekeeper process of the plurality of gatekeeper processes to locate the respective information, wherein the first gatekeeper process is configured to retrieve targeted data in an optimized manner, as compared to other ones of the plurality of gatekeeper processes, using one or more database queries; and
  - in accordance with a determination that the request is an aggregate data request, using a second gatekeeper process of the plurality of gatekeeper processes, that is different from the first gatekeeper process, to locate and aggregate the respective information, wherein the second gatekeeper process is configured to retrieve and aggregate data in an optimized manner, as compared to other ones of the plurality of gatekeeper processes, using one or more database queries.

16. The non-transitory computer readable storage medium of claim 15, wherein the first storage area and the second storage area are not directly accessible by the first data-collection server system and the second data-collection server system.

17. The non-transitory computer readable storage medium of claim 15, wherein the first storage area and the second storage area are controlled by the data-management server system.

18. The non-transitory computer readable storage medium of claim 15, wherein the one or more programs further include instructions for: prior to storing the first information in the first storage area and storing the second information in the second storage area, storing the first information and the second information in a common storage area.

19. The non-transitory computer readable storage medium of claim 15, wherein:
- the first data-collection server system collects first campaign-feedback data related to interaction of recipients of a first set of one or more message campaigns with messages of the first set of one or more message campaigns and provides the first information, corresponding to the first campaign-feedback data, to the data-management server system; and
- the second data-collection server system collects second campaign-feedback data related to interaction of recipients of a second set of one or more message campaigns with messages of the second set of one or more message campaigns and provides the second information, corresponding to the second campaign-feedback data, to the data-management server system, wherein the second set of one or more message campaigns are distinct from the first set of one or more message campaigns.

20. The non-transitory computer readable storage medium of claim 19, wherein each of the first data-collection server system and second data-collection server system cause a respective plurality of message campaigns to be delivered to a respective plurality of client devices associated with a plurality of users, wherein a respective message campaign of the plurality of message campaigns includes one or more messages addressed to at least a subset of the respective plurality of users.

* * * * *